United States Patent
Ramakrishnan

(10) Patent No.: US 6,976,021 B2
(45) Date of Patent: Dec. 13, 2005

(54) METHOD, SYSTEM, AND COMPUTER PROGRAM PRODUCT FOR MANAGING A RE-USABLE RESOURCE WITH LINKED LIST GROUPS

(75) Inventor: Balakrishnan Ramakrishnan, Sunnyvale, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 888 days.

(21) Appl. No.: 09/909,549

(22) Filed: Jul. 19, 2001

(65) Prior Publication Data
US 2003/0018689 A1    Jan. 23, 2003

(51) Int. Cl.⁷ ............................................. G06F 17/30
(52) U.S. Cl. ......................................................... 707/7
(58) Field of Search .................... 707/1–10, 100–104.1, 707/200–206; 711/171; 345/543, 552

(56) References Cited

U.S. PATENT DOCUMENTS

| | | | | |
|---|---|---|---|---|
| 5,109,336 A | * | 4/1992 | Guenther et al. | 711/171 |
| 5,432,908 A | | 7/1995 | Heddes et al. | 711/147 |
| 5,765,165 A | | 6/1998 | Harper | 707/200 |
| 5,848,423 A | * | 12/1998 | Ebrahim et al. | 707/206 |
| 5,920,561 A | | 7/1999 | Daniel et al. | 370/395.6 |
| 6,233,630 B1 | | 5/2001 | Wilhelm | 710/56 |
| 6,650,333 B1 | * | 11/2003 | Baldwin | 345/552 |
| 6,683,615 B1 | * | 1/2004 | Baldwin | 345/543 |
| 2004/0143562 A1 | * | 7/2004 | Chen et al. | 707/1 |
| 2005/0015396 A1 | * | 1/2005 | Vu | 707/100 |

OTHER PUBLICATIONS (no author), Software Design Using C++: An online book, Linked Lists, (no date) www.cis.stvincent.edu, pp. 1-11.*
(no author), Doubly linked lists, cursor-based lists, stacks, 5-2003, www.cs.dartmouth.edu, pp. 1-6).*
Ori Shalev et al., Split-ordered lists: lock-free extensible hash tables, 2003, ACM Press, pp. 102-111.*

* cited by examiner

Primary Examiner—Diane Mizrahi
(74) Attorney, Agent, or Firm—Mark A. Wilson

(57) ABSTRACT

A pool of integers is managed by dividing the pool of integers into groups and initializing, in memory, doubly linked lists related to the groups on an as needed basis in response to requests to allocate integers. If an initialized group of integers no longer includes any allocated integers, the doubly linked list related to the group is deleted from memory. Memory locations of the group-specific doubly linked lists are identified by a hash table that includes a unique hash table pointer for each one of the groups. Each element of the doubly linked list includes a next pointer for identifying a next element and a previous pointer for identifying a previous element. A specific free integer can be allocated in an order of one, O(1), operation by indexing into the linked list and utilizing the next and previous pointers of the linked list element to remove the linked list element from the linked list.

43 Claims, 18 Drawing Sheets

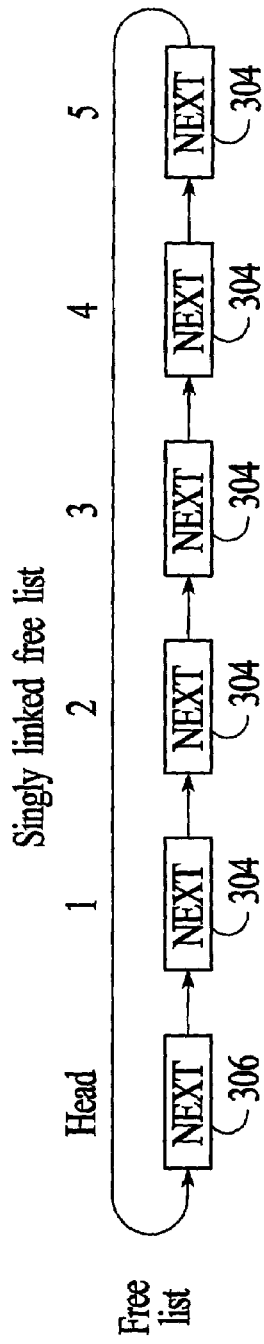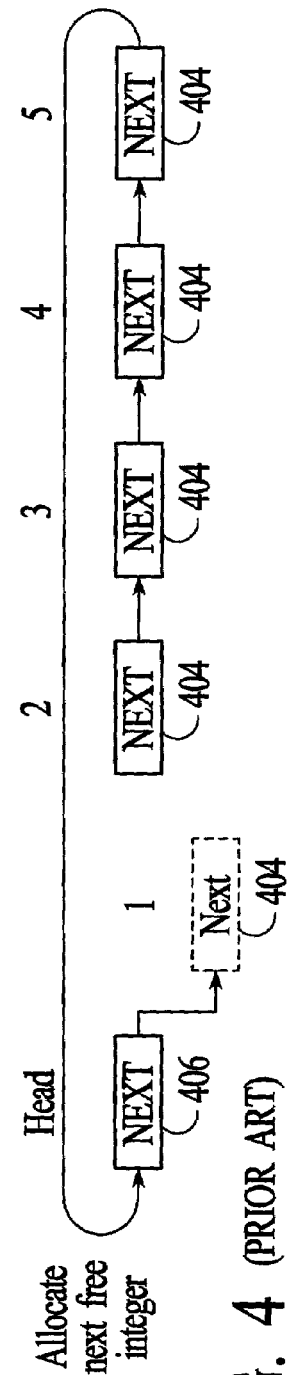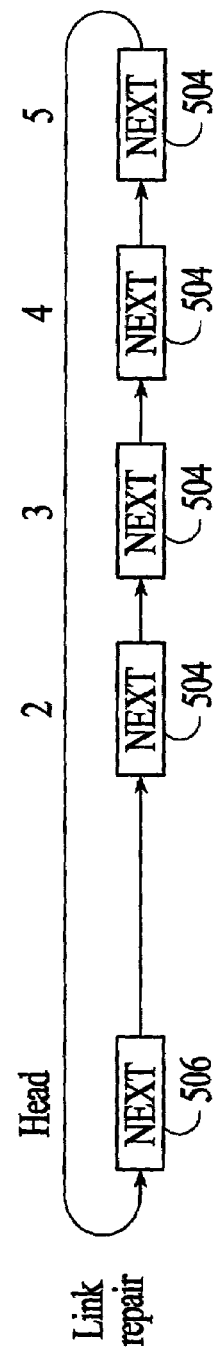
FIG. 3 (PRIOR ART)
FIG. 4 (PRIOR ART)
FIG. 5 (PRIOR ART)

METHOD, SYSTEM, AND COMPUTER PROGRAM PRODUCT FOR MANAGING A RE-USABLE RESOURCE WITH LINKED LIST GROUPS

CROSS REFERENCE TO RELATED APPLICATION

The present application is related to application Ser. No. 09/888,209 filed Jun. 22, 2001.

FIELD OF THE INVENTION

The invention relates generally to managing a re-usable resource, and more particularly to managing a pool of integers using a linked list of elements that are stored in computer memory.

BACKGROUND OF THE INVENTION

Linked lists are widely used to link blocks of related data within computer memory and to identify blocks of memory that are available to store data. FIG. 1 depicts a series of available memory blocks 102 (also referred to as a "free" list) that are linked together by pointers 104 at the end of each block. The head of the free list is a free list pointer 106 that identifies the first free memory block and the end of the free list is identified by a "null" pointer. When memory blocks are needed to store data, the memory blocks are allocated in successive order from the free list by adjusting the free list pointer to exclude allocated memory blocks.

FIG. 2 depicts how the free list head pointer 206 is adjusted to exclude the first memory block 208 that has been allocated to store data. When a memory block is no longer needed to store data, the block can be added to the "head" or "front" of the free list by adjusting the free list head pointer to identify the newly freed memory block and by adjusting the pointer of the newly freed memory block to identify the next free memory block. Because newly freed memory blocks are added to the head of the list, the free integers are allocated on a last-in first-out (LIFO) basis. This technique for managing memory works well when the memory blocks are needed to store data, however it is not such an efficient technique for managing a list of integers that are available from an integer pool. Managing a list of integers instead of memory blocks is useful in several computing applications. For example, managing a list of integers is useful for allocating asynchronous transfer mode (ATM) virtual circuits (VCs) in an ATM network. Throughout the description, similar reference numbers may be used to identify similar elements.

U.S. Pat. No. 6,233,630 issued to Wilhelm discloses a technique for managing a list of free integers that is memory efficient. The technique involves defining an integer pool by pre-allocating a block of memory for every integer in the pool, with the memory block for every integer consisting entirely of a pointer that identifies the next integer in the linked list of free integers. That is, the integer pool consists entirely of links and therefore the amount of memory required to identify each integer is related to the size of the integer pool. For example 256 integers can be uniquely identified with eight bit pointers. FIG. 3 depicts a singly linked list of free integers where the integers consist entirely of pointers 304 that indicate the next integer in the list and where the first free integer in the list is indicated by a head element 306. The free integers are allocated in the order of the singly linked list. For example, when a free integer is needed, the next integer identified by the head element is allocated as indicated in FIG. 4. Allocating an integer (that is, removing the related element from the linked list) involves adjusting the pointer of the head element to identify the next element in the linked list as indicated in FIG. 5. When an allocated integer becomes freed and needs to be added back to the free list, the pointer of the head element is adjusted to identify the linked list element of the newly freed integer and the linked list element of the newly freed integer is adjusted to point to the integer that was previously identified by the head element.

While utilizing a singly linked list works well to identify a next free integer (i.e., where the next free integer can be any free integer from the integer pool), a singly linked list is not as efficient when a specific integer must be allocated from an integer pool, for example, when trying to reserve a specific ATM VC. A problem involved with allocating a specific integer using a singly linked list is that repairing the linked list of elements is an O(n) operation, where n is the number of integers in the integer pool. That is, allocating a specific integer (for example integer four) involves indexing into the array of linked list elements to the linked list element that represents integer four and then removing the linked list element from the linked list of elements. Removing a specific element from the linked list involves adjusting the pointer value of the element that is directly previous to the specific element to skip over the specific integer. For example, referring to FIG. 6, removing the element that relates to integer four involves adjusting the pointer value of the previous element (i.e., adjusting the pointer for integer three to identify integer five). The problem involved with adjusting the pointer value of the previous element is that the location of the previous element is not readily known. Locating the previous element in a singly linked list is an O(n) operation that involves sequentially searching through the array of elements until the previous element is found. In time critical applications, it is desirable to avoid O(n) operations.

Although the technique described by Wilhelm is memory efficient, the technique involves pre-allocating a block of memory for every integer in the desired integer pool regardless of how many unique integers are currently being utilized by the particular application. For example, if an integer pool consists of one hundred unique integers, then one hundred memory blocks are pre-allocated even if only five unique integers are being utilized. In applications that require a large integer pool but exhibit low integer utilization, the amount of memory dedicated to unutilized integers can be significant. For example, certain telecommunications applications require a large number of uniquely identifiable VCs to be available for worst case scenarios, while actual utilization of the unique integers is typically a small fraction of the required number. Reducing the memory requirements for managing an integer pool can free up memory for other uses and may reduce hardware costs.

Although the prior art discloses a memory efficient technique for allocating a unique integer from an integer pool, there is a need to be able to allocate specific integers as well as a next free integer in an efficient manner. In addition, there is a need to conserve the memory resources required to manage an integer pool, especially as the size of the integer pool increases. As a result, what is needed is an efficient way to allocate free integers from an integer pool that allows the selection of a specific free integer from an integer pool as well as the selection of any free integer from the integer pool and that conserves memory.

SUMMARY OF THE INVENTION

The invention involves managing a pool of integers by dividing the pool of integers into groups of integers and initializing, in memory, doubly linked lists related to the groups of integers on an as needed basis in response to requests to allocate integers. If an initialized group of integers no longer includes any allocated integers, the doubly linked list related to the group of integers is deleted from memory. Initializing doubly linked lists related to groups of integers on an as needed basis and deleting doubly linked lists with no allocated integers is more memory efficient than techniques which pre-initialize memory for all of the integers in the pool. In an embodiment, the memory locations of the group-specific doubly linked lists are identified by a hash table that includes a unique hash table pointer for each one of the groups of integers. If the doubly linked list related to a particular group of integers is active, the hash table pointer for that group of integers identifies the memory location of the doubly linked list. If the doubly linked list related to a group of integers is inactive (that is, does not exist in memory), the hash table pointer indicates that the doubly linked list is inactive.

An embodiment of a method for managing a re-usable resource involves dividing a pool of integers into groups that include unique sets of integers and initializing, in computer memory, a doubly linked list that represents one of the groups of integers in response to a request for a free integer, wherein the one group of integers includes the free integer.

An embodiment of the method further includes deleting, from the computer memory, an active doubly linked list that represents one of the groups of integers when all of the integers in the one group are free.

In an embodiment of the method, initializing a doubly linked list involves establishing an array of linked list elements that defines the group of integers, wherein each linked list element includes a next pointer for identifying a next linked list element and a previous pointer for identifying a previous linked list element, forming a doubly linked list, from the linked list elements, that includes all of the integers in the group of integers, and establishing a head element having a next pointer for identifying one end of the doubly linked list and a previous pointer for identifying the other end of the doubly linked list.

In an embodiment of the method, dividing the pool of integers into groups involves establishing a hash table that includes hash table pointers, wherein the hash table pointers identify locations in the computer memory of doubly linked lists that are related to the groups of integers. In an embodiment, the hash table pointers are related to hash table index values.

When utilizing a hash table to identify the locations of doubly linked lists, a next free integer can be allocated by using the hash table pointers to search through active doubly linked lists for a next free integer. If a next free integer exists on an active doubly linked list, then the linked list element related to the next free integer is removed from the respective doubly linked list. If a next free integer does not exist in any of the active doubly linked lists, then a new doubly linked list is initialized in the computer memory and a linked list element is removed from the new doubly linked list. In an embodiment, removing a linked list element involves accessing a free list head element to identify the next free integer in the doubly linked list.

When utilizing a hash table to identify the locations of doubly linked lists, a specific free integer can be allocated by determining a hash table index related to the specific free integer, using the hash table index to identify a related hash table pointer, and using the hash table pointer to determine if the related doubly linked list is active. If the doubly linked list is active, then the linked list element that is related to the specific integer is indexed and the linked list element is removed from the doubly linked list. If the doubly linked list is not active, then a doubly linked list that is related to the group of integers that includes the specific integer is initialized, the doubly linked list is indexed to the linked list element that is related to the specific integer, and the linked list element, that corresponds to the specific integer, is removed from the doubly linked list.

In an embodiment, removing a linked list element involves using the next pointer, of the linked list element that corresponds to the specific integer, to identify the next linked list element in the doubly linked list, adjusting the previous pointer of the identified next linked list element to exclude, from the doubly linked list, the linked list element that corresponds to the specific integer, using the previous pointer, of the linked list element that corresponds to the specific integer, to identify the previous linked list element in the doubly linked list, and adjusting the next pointer of the identified previous linked list element to exclude, from the doubly linked list, the linked list element that corresponds to the specific integer.

When utilizing a hash table to identify the locations of doubly linked lists, a specific integer can be freed by determining a hash table index related to the specific integer, using the hash table index to locate the linked list element that is related to the specific integer, and attaching the linked list element to the doubly linked list of free integers that is related to the group of integers that includes the specific integer. In an embodiment, if all of the integers in the group of integers that includes the specific integer are free, then the related doubly linked list is deleted from the computer memory.

The invention is also embodied as a system for managing a reusable resource and as a computer program product for managing a reusable resource. The system and computer program product implement essentially the same technique as the method that is described above.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 depicts a singly linked list of free integers where the integers are represented entirely by pointers that indicate the next integer in the list and where the first free integer in the list is indicated by a head element.

FIG. 4 depicts the next free integer that is to be removed from the singly linked list of FIG. 3.

FIG. 5 depicts the singly linked list of FIG. 3 after the pointer of the head element is adjusted to remove integer one from the linked list of free integers.

DETAILED DESCRIPTION OF THE INVENTION

The invention involves managing a pool of integers by dividing the pool of integers into groups of integers and initializing, in memory, doubly linked lists related to the groups of integers on an as needed basis in response to requests to allocate integers. If an initialized group of integers no longer includes any allocated integers, the doubly linked list related to the group of integers is deleted from memory. Initializing doubly linked lists related to groups of integers on an as needed basis and deleting doubly linked lists with no allocated integers is more memory efficient than techniques which pre-initialize memory for all of the integers in the pool. In an embodiment, the memory locations of the group-specific doubly linked lists are identified by a hash table that includes a unique hash table pointer for each one of the groups of integers. If the doubly linked list related to a particular group of integers is active, the hash table pointer for that group of integers identifies the memory location of the doubly linked list. If the doubly linked list related to a group of integers is inactive (that is, does not exist in memory), the hash table pointer indicates that the doubly linked list is inactive.

Managing a pool of integers with a doubly linked list is described for background purposes with reference to FIGS. 7–17 and managing a pool of integers by dividing the pool of integers into groups of integers and initializing, in memory, doubly linked lists related to the groups of integers on an as needed basis in response to requests to allocate integers is described with reference to FIGS. 18–28.

Managing a pool of integers with a doubly linked list involves establishing a doubly linked list of elements, with each element of the doubly linked list including a next pointer for identifying a next element in the linked list and a previous pointer for identifying a previous element in the linked list. A specific free integer can be allocated from the doubly linked list in an order of one, O(1), operation by indexing into the linked list to the linked list element that represents the integer and then utilizing the next and previous pointers of the linked list element to remove the linked list element from the linked list. The desired linked list element is removed by adjusting the next pointer of the previous linked list element and the previous pointer of the next linked list element. A non-specific free integer can be allocated from the doubly linked list in an O(1) operation through a head element that identifies a next free integer in the linked list. A non-specific free integer includes any one of the free integers in the linked list of free integers. Utilizing a doubly linked list, a resource allocation scheme that can allocate a specific free integer and a next free integer in O(1) operations is achieved.

Figure 1:
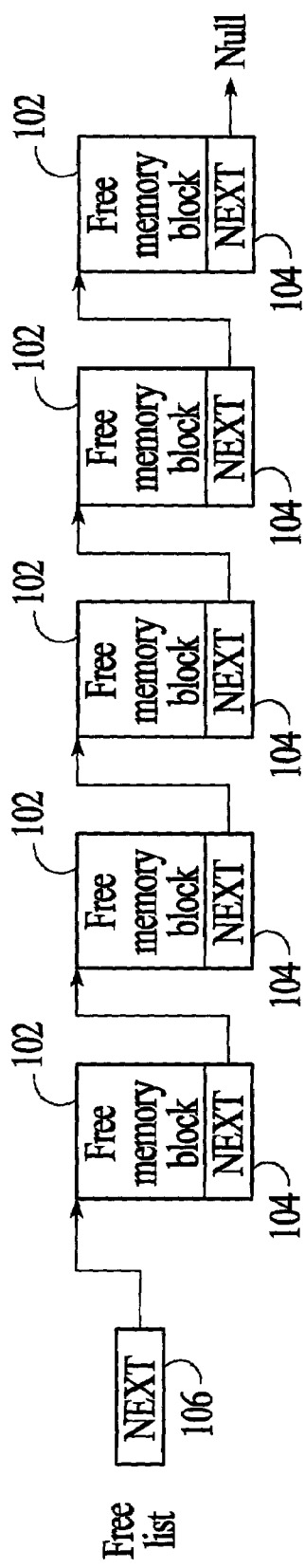
FIG. 1 depicts a series of available memory blocks that are linked together by pointers at the end of each block.
Figure 2:
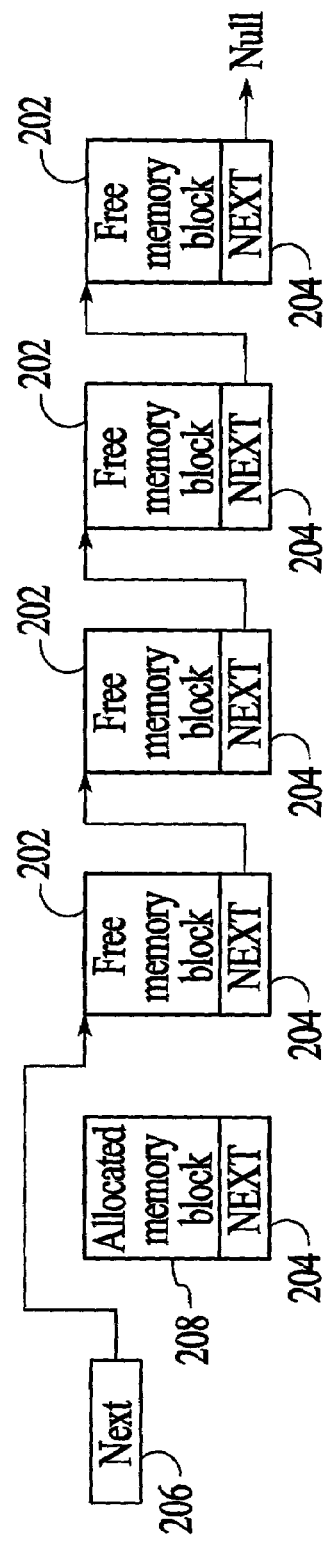
FIG. 2 depicts how the free list pointer of FIG. 1 is adjusted to exclude the first memory block that has been allocated to store data.
Figure 6:
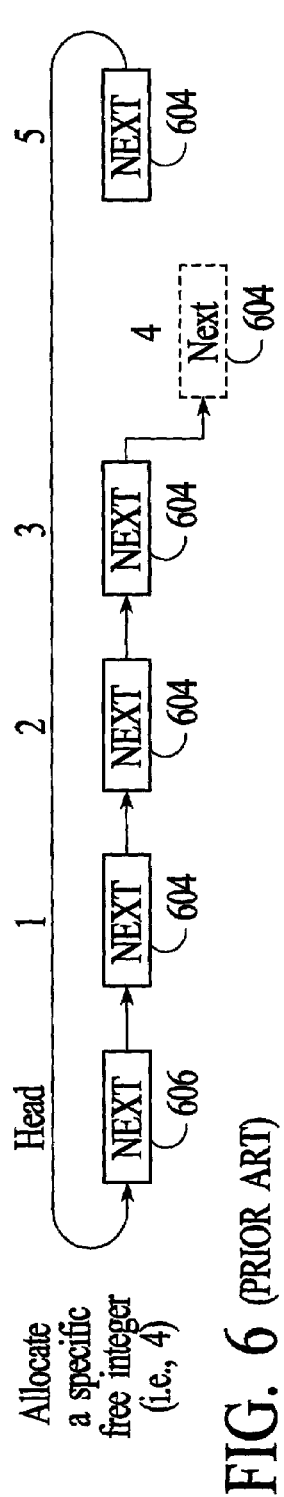
FIG. 6 depicts a specific integer, integer four, that is to be removed from the singly linked list of FIG. 3.
Figure 7:
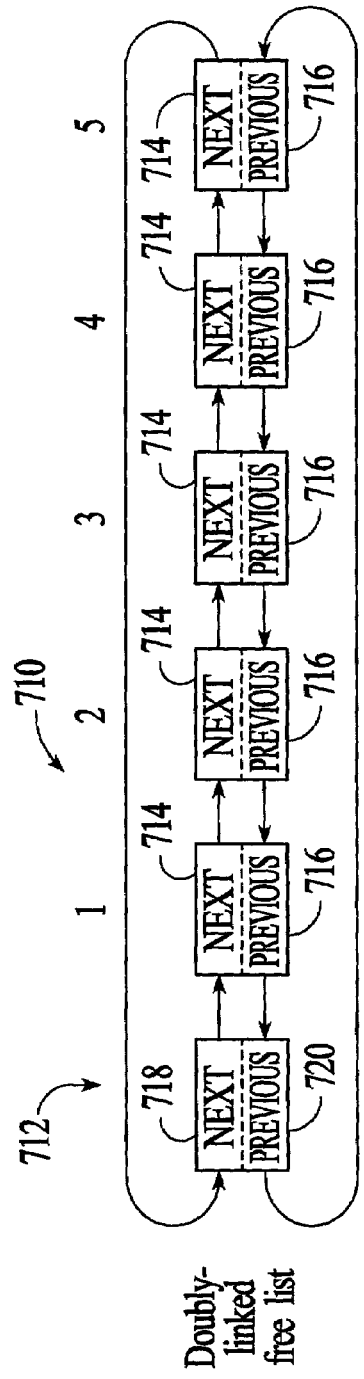
FIG. 7 depicts a doubly linked list and a head element that are used to manage a re-usable resource such as a pool of integers in accordance with an embodiment of the invention.

FIG. 7 depicts a logical representation of a doubly linked list 710 and a head element 712 that are used to manage a re-usable resource such as a pool of integers. The doubly linked list includes a number, n, of linked list elements, where each linked list element is related to a unique one of the n integers. In the example of FIG. 7, the integers associated with the linked list elements are identified above the linked list elements. Each linked list element includes a NEXT pointer 714 for identifying a next linked list element in the list and a PREVIOUS pointer 716 for identifying a previous linked list element in the list. The head element includes a NEXT pointer 718 for identifying the next linked list element and a PREVIOUS pointer 720 for identifying the previous linked list element. In the embodiment of FIG. 7, the NEXT pointer of the head element identifies the head, or front, of the linked list and the PREVIOUS pointer of the head element identifies the end, or back, of the linked list. In the embodiment of FIG. 7, the linked list of elements represents free integers (unallocated integers) from an integer pool and is referred to as the free list. The act of allocating an integer from the free list involves removing the linked list element that is related to the integer from the linked list. When an allocated integer is no longer needed, it is added back to the free list.

In an embodiment, establishing linked list elements involves initializing an array of n linked list elements in a computer memory, where n is the number of integers that is to be managed. Each of the linked list elements in the array is related to a unique one of the n integers and includes contiguous next and previous pointer fields. Initially, the pointers of the linked list elements are set to link the integers in numerical order (i.e., 1 to n). Likewise, initially the NEXT pointer of the head element is set to identify the linked list element that is related to the first integer (i.e. 1) and the PREVIOUS pointer of the head element is set to identify the linked list element that is related to the last integer (i.e., n).

Figure 8:
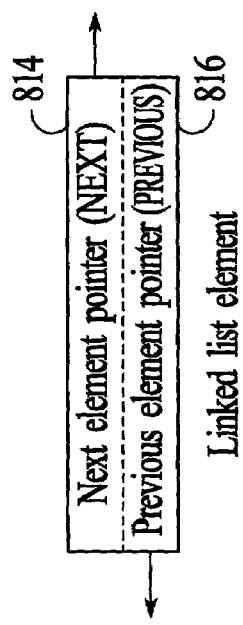
FIG. 8 depicts an expanded view of an example linked list element from the doubly linked list of FIG. 7.

FIG. 8 depicts an expanded view of an example linked list element from the doubly linked list of FIG. 7. The linked list element includes a NEXT pointer 814 for identifying a next linked list element and a PREVIOUS pointer 816 for identifying a previous linked list element. In the embodiment, the pointers identify the linked list elements using the integer values that are related to the linked list elements. That is, the linked list element related to integer one is identified by a binary pointer value of one, the linked list element related to integer two is identified by a binary pointer value of two, and so on. In the embodiment of FIG. 8 the NEXT and PREVIOUS pointer fields include sixteen bits (two bytes) each, such that a total of 65,536 (i.e., integers 0–65,535) integers can be uniquely identified within each field. Although the NEXT and PREVIOUS pointer fields include sixteen bits each in the example of FIG. 8, the pointer fields can be scaled up or down to meet the needs of an individual application. For example, up to 255 integers can be uniquely represented with eight bit NEXT and PREVIOUS pointer fields.

Figure 9A:
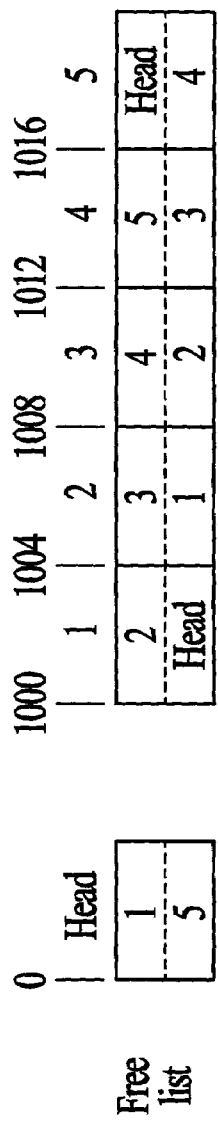
FIG. 9A depicts a head element and a doubly linked list of linked list elements that represents free integers in an integer pool in accordance with an embodiment of the invention.

Utilizing a doubly linked list to manage a pool of integers is described in detail with reference to FIGS. 9A–9C. FIG. 9A depicts a head element and a doubly linked list of free, or unallocated, linked list elements that represents free integers in an integer pool. In the example, the free integers are 1, 2, 3, 4, and 5 and each linked list element consumes four bytes of memory. It should be understood that an integer pool of 65,535 (i.e., integers 1–65,535 with zero being reserved for identifying the head element) can be uniquely identified with four byte linked list elements. Referring to FIG. 9A, the linked list element that represents integer one starts at example memory address 1000, the linked list element that represents integer two starts at example memory address 1004 (the start address plus four bytes) and so on. The NEXT pointer of the head element identifies the linked list element for integer one (which is the integer at the head of the free list) and the PREVIOUS pointer of the head element identifies the linked list element for integer five (which is the integer at the end of the free list). In the initial state, the NEXT and PREVIOUS pointers of the linked list elements are set to values that establish the linked list in numbered order (i.e., 1, 2, 3, 4, 5), although the initial order is disrupted as integers are allocated and then returned to the free list. In order to establish a connection to the head element, the PREVIOUS pointer of linked list element one (the first element in the linked list) and the NEXT pointer of linked list element five (the last element in the linked list) point to the head element. In an embodiment, a null value (i.e., zero) is used to identify the head element.

The doubly linked list technique described with reference to FIGS. 7–9C is used to allocate specific free integers and next free integers in O(1) operations. The operation of allocating a specific free integer involves indexing into the array of linked list elements to the linked list element that is related to the specific integer and then using the NEXT and PREVIOUS pointers of the linked list element to remove the linked list element from the linked list. For example, referring to FIG. 9B, allocating integer four from the linked list of FIG. 9A involves using the NEXT and PREVIOUS pointers to identify and adjust pointers of the directly linked elements. Specifically, the PREVIOUS pointer of linked list element four is used to identify the previous element (linked list element three) and to adjust the NEXT pointer of the previous element to exclude linked list element four. Likewise, the NEXT pointer of linked list element four is used to identify the next element (linked list element five) and to adjust the PREVIOUS pointer of the next element to exclude linked list element four.

Figure 9B:
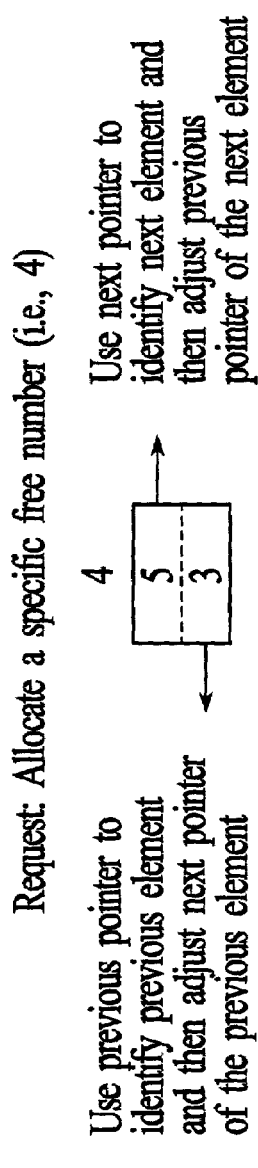
FIG. 9B depicts how the NEXT and PREVIOUS pointers of a specific integer are used to remove the specific integer from a doubly linked list of free integers in accordance with an embodiment of the invention.

In the example of FIG. 9B, the PREVIOUS pointer of element four is used to identify linked list element three and the NEXT pointer of linked list element three is adjusted to identify linked list element five (the same value as the next pointer of element four). In addition, the NEXT pointer of element four is used to identify linked list element five and the PREVIOUS pointer of linked list element five is adjusted to identify linked list element three (the same value as the previous pointer of element four).

Figure 9C:
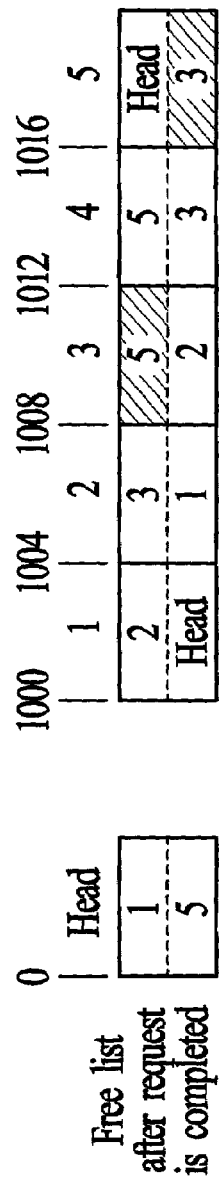
FIG. 9C depicts the doubly linked list of FIG. 9A after the specific integer has been removed from the doubly linked list of free integers.

FIG. 9C depicts the linked list after linked list elements three and five have been adjusted to remove linked list element four from the free list, that is, after integer four has been allocated. Because the specific integer is allocated without having to search through the array of elements to locate the previous element in the linked list, the integer is allocated in an O(1) operation. Without the PREVIOUS pointer of the doubly linked list, removing element four from a singly linked list would require searching the entire linked list to find the pointer that identifies the allocated integer and then copying the pointer value of the allocated integer into the pointer of the previous linked list element. Searching through the entire linked list is an O(n) operation, which requires more processor cycles and is undesirable in time critical operations.

The operation of allocating the next free integer involves accessing the head element and referring to the NEXT pointer of the head element to identify the next free integer. In the example of FIG. 9A, the head element identifies integer one and therefore a request for the next free integer results in integer one being allocated. Allocating integer one involves removing the linked list element related to integer one from the linked list by adjusting the NEXT pointer of the head element and the PREVIOUS pointer of the integer that is linked to the newly allocated integer. For example, referring to FIG. 9A, the NEXT pointer of the head would be adjusted to identify integer two and the PREVIOUS pointer of integer two would be adjusted to identify the head. Because integer one is allocated in one operation without having to search through the array of elements, the integer allocation is an O(1) operation. In the embodiment of FIGS. 7–9C, a request for "any" free integer (that is, where the only requirement is that the integer is free) is satisfied in the same manner as a request for the next free integer. For example, when a request for a free integer does not specify a specific integer, the next free integer is allocated in response to the request.

As briefly stated above, the operation of freeing an integer involves adding the freed integer (and therefore its related linked list element) back to the linked list of free integers. In one embodiment, freed integers are added to the head or front of the linked list of free integers. Adding a freed integer to the front of the linked list involves adjusting the NEXT pointer of the head element to identify the newly freed integer and adjusting the PREVIOUS pointer of the integer that was at the front of the linked list before the addition of the freed integer. Adding freed integers to the front of the linked list causes the integers to be allocated on a last-in first-out (LIFO) basis in response to requests for the next free, or any free, integer. That is, the last integer to be added to the free list is the first integer allocated from the list in response to a request for the next free or any free integer. Adding freed integers to the front of the list is an O(1) operation.

In another embodiment, freed integers are added to the end or tail of the linked list of free integers. Adding a freed integer to the end of the linked list involves adjusting the PREVIOUS pointer of the head element to identify the newly freed integer and adjusting the NEXT pointer of the integer that was at the end of the linked list before the addition of the freed integer. Adding freed integers to the end of the linked list causes the integers to be allocated on a first-in first-out (FIFO) basis in response to requests for the next free, or any free, integer. That is, the first integer to be added to the free list is the first integer allocated from the list in response to a request for the next free, or any free, integer.

Allocating integers on a FIFO basis instead of a LIFO basis is advantageous in some applications because it increases the delay between allocations of the same integer. Adding free integers to the end of a doubly linked free list is an O(1) operation because the PREVIOUS pointer of the head element identifies the end of the linked list. In contrast, adding a free integer to the end of a singly linked free list is not an O(1) operation because the end of the singly linked list is not readily known. With a singly linked list, the end of the singly linked list is determined by searching through the linked list in an O(n) operation.

An embodiment of the invention includes a free list and an allocated list that work in tandem to manage a pool of integers. The free list is described above and the allocated list is a doubly linked list that is essentially the same as the free list. The allocated list includes an allocated list head element having NEXT and PREVIOUS pointers that identify the first and last elements in the linked list of allocated integers. Providing both a free list and an allocated list allows for easy call up and display of the free integers and/or the allocated integers. If a free list is the only list that is maintained then it is not an efficient operation to call up the allocated integers. In an embodiment, an extra field (i.e., a single bit) may be added to the linked list elements to identify whether the elements are linked to the free list or to the allocated list.

Figure 10:
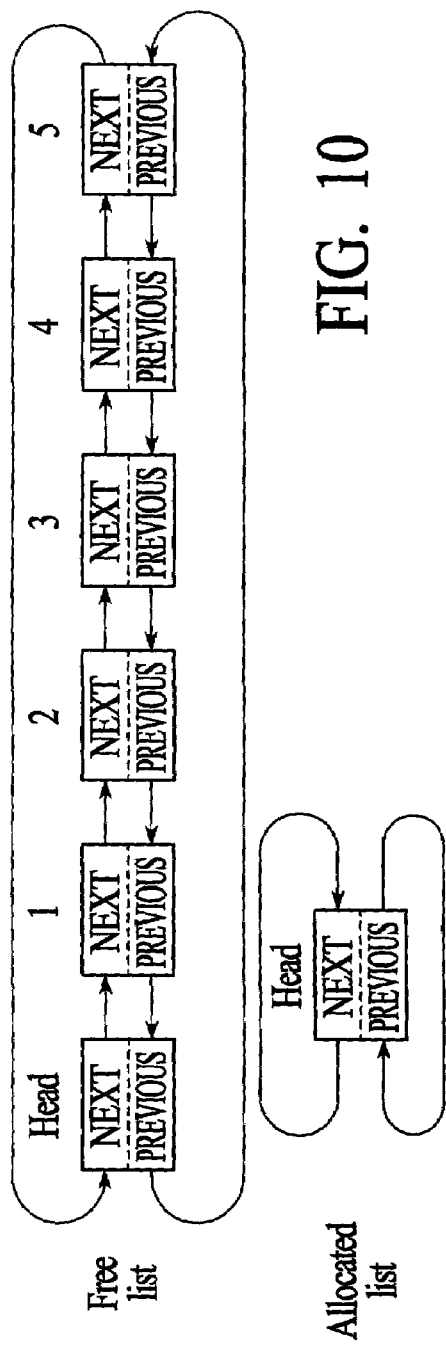
FIG. 10 depicts a free list head element, an allocated list head element, and a pool of five integers that are initially linked on the free list.

FIGS. 10–17 depict examples of dual doubly linked lists that are used to manage a re-usable resource such as a pool of integers. FIG. 10 depicts a free list, an allocated list, and a pool of five integers. FIG. 10 represents an initial state in which all five integers are on the free list. In the embodiment, the five integers are initially linked in numerical order (i.e., 1, 2, 3, 4, and 5). Referring to the free list head element, the NEXT pointer identifies integer one and the PREVIOUS pointer identifies integer five. Referring to the allocated list head element, the NEXT and PREVIOUS pointers point to themselves.

Figure 11:
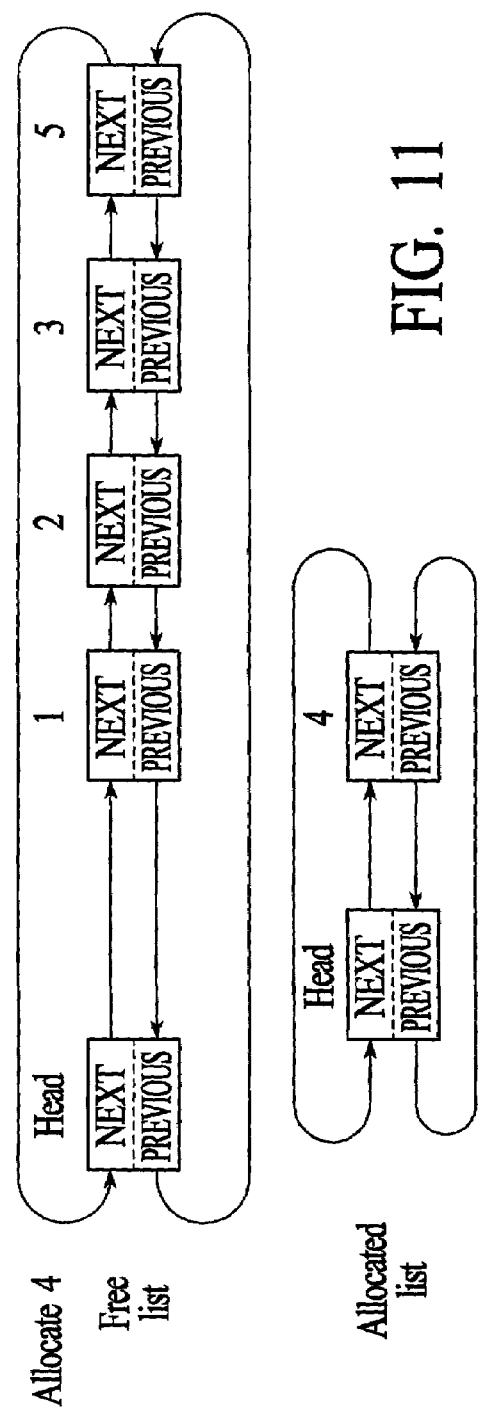
FIG. 11 depicts the free and allocated lists from FIG. 10 after a specific integer, integer four, is allocated.

Allocating a specific integer from the integer pool involves indexing into the location of the specific integer and removing the integer from the free list (as described above with reference to FIGS. 9A–9C). The allocated integer is then added to the allocated list. FIG. 11 depicts a logical representation of the free and allocated lists from FIG. 10 after a specific integer, integer four, is allocated. The linked list element for integer four is removed from the free list and added to the allocated list in two O(1) operations. The NEXT and PREVIOUS pointers of the adjacent linked list elements are adjusted utilizing the NEXT and PREVIOUS pointers of the doubly linked lists.

Figure 12:
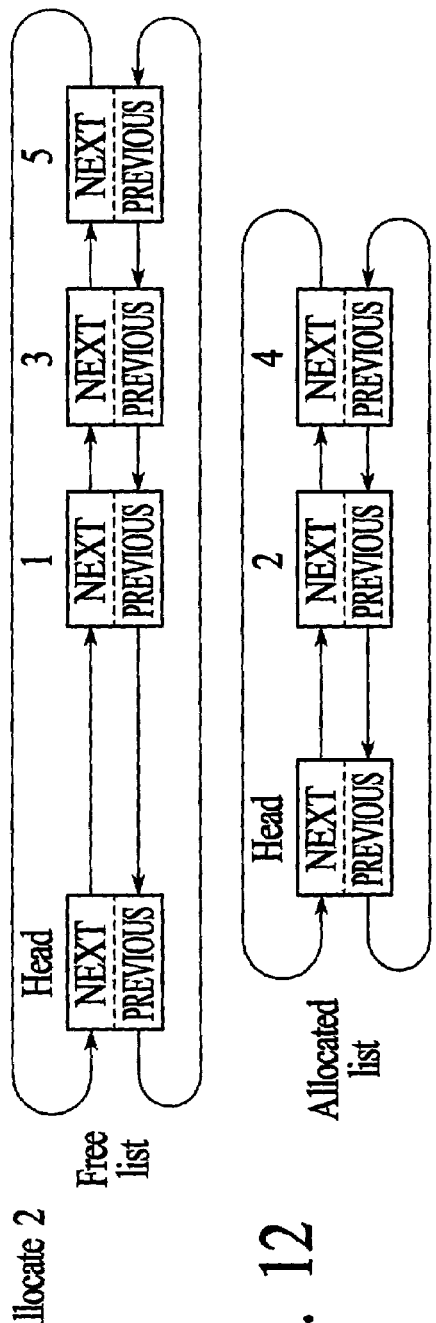
FIG. 12 depicts the free and allocated lists from FIG. 11 after another specific integer, integer two, is allocated.

FIG. 12 depicts a logical representation of the free and allocated lists from FIG. 11 after another specific integer, integer two, is allocated. The linked list element for integer two is removed from the free list and added to the allocated list in two O(1) operations. In the embodiment of FIG. 12, the allocated integer is added to the front of the allocated list although it could alternatively be added to the end of the allocated list as described above.

Figure 13:
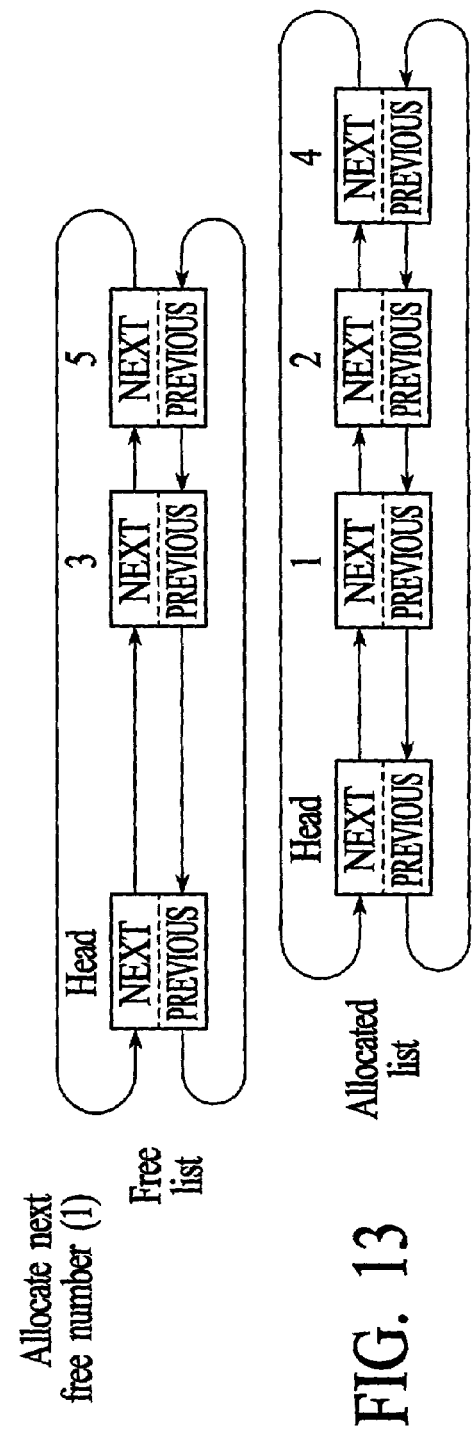
FIG. 13 depicts the free and allocated lists from FIG. 12 after the next free integer, integer one, is allocated.

Allocating a next free, or any free, integer from the integer pool involves accessing the head element and removing the element that is identified by the NEXT pointer of the head element. FIG. 13 depicts a logical representation of the free and allocated lists from FIG. 12 after the next free integer is allocated. The element identified by the NEXT pointer (linked list element one) is removed from the free list in an O(1) operation. In the embodiment of FIG. 13, the allocated integer is added to the front of the allocated list.

Figure 14:
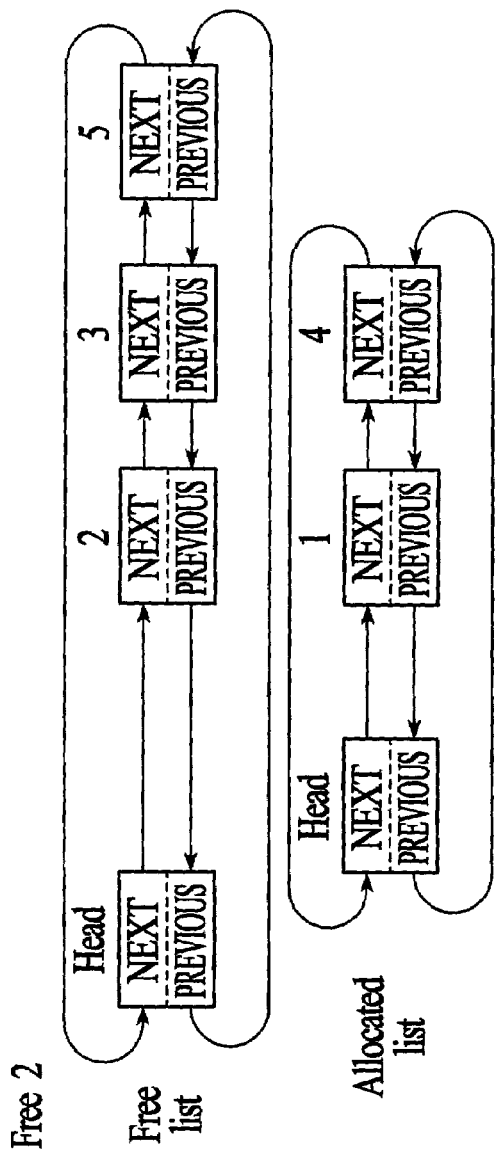
FIG. 14 depicts the free and allocated lists from FIG. 13 after a specific integer, integer two, is added to the free list in a last-in first-out (LIFO) manner.

FIG. 14 depicts a logical representation of the free and allocated lists from FIG. 13 after a specific integer, integer two, is freed (that is, added to the free list). The linked list element for integer two is removed from the allocated list and added back to the free list in two O(1) operations. The freed integer is added to the front of the free list, thereby producing a LIFO allocation scheme.

Figure 15:
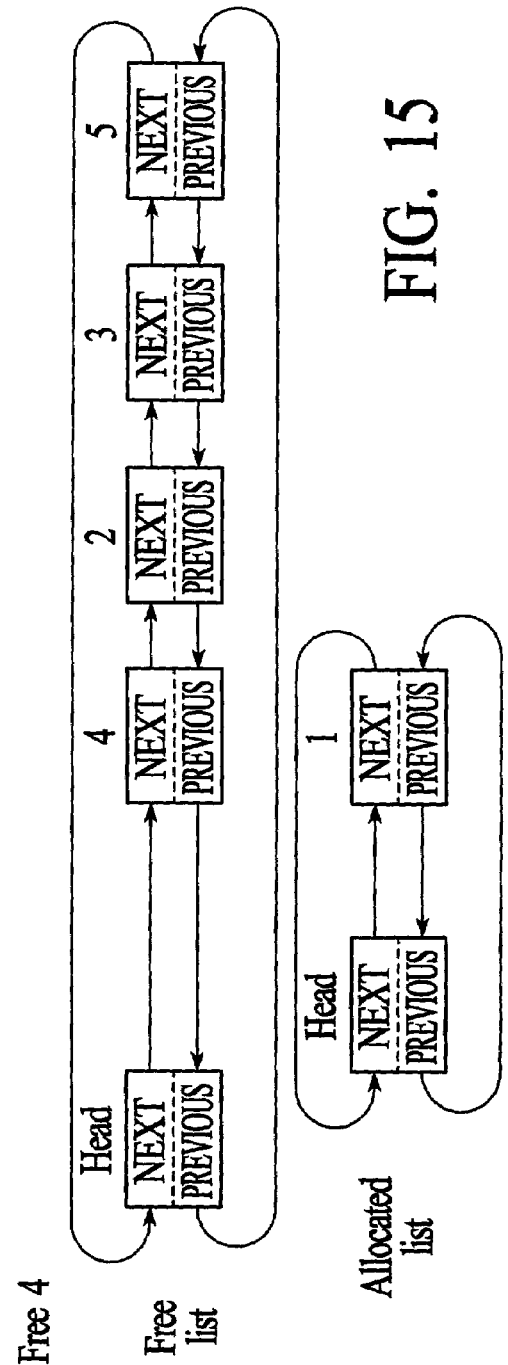
FIG. 15 depicts the free and allocated lists from FIG. 14 after another specific integer, integer four, is added to the free list in a LIFO manner.

FIG. 15 depicts a logical representation of the free and allocated lists from FIG. 14 after another specific integer, integer four, is freed. The linked list element for integer four is removed from the allocated list and added to the free list in two O(1) operations. The freed integer is added to the front of the free list, thereby maintaining the LIFO allocation scheme.

Figure 16:
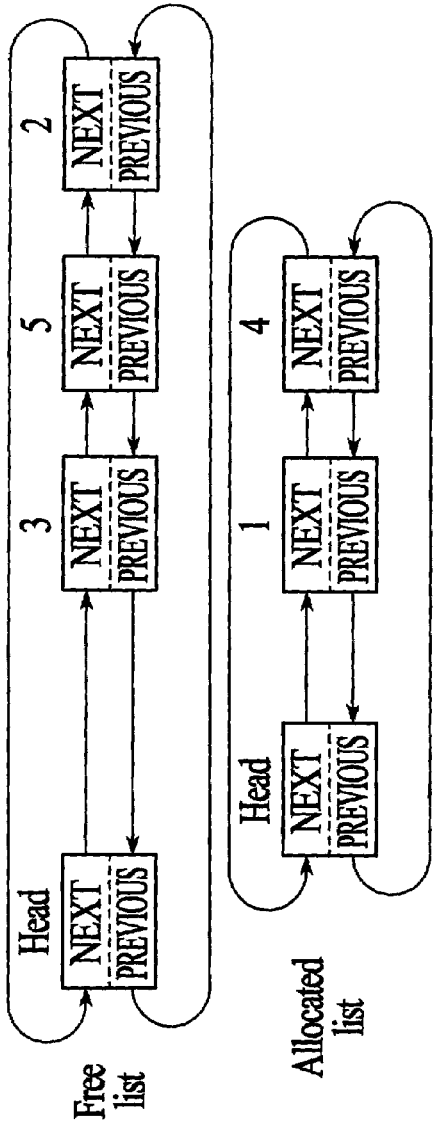
FIG. 16 depicts the free and allocated lists from FIG. 13 after a specific integer, integer two, is added to the free list in a first-in first-out (FIFO) manner.

In an alternative embodiment, freed integers are added to the end of the free list, thereby producing a FIFO allocation scheme. FIG. 16 depicts a logical representation of the free and allocated lists from FIG. 13 after integer two is freed and added to the end of the free list instead of to the front of the free list as is the case in FIG. 14. The free list of FIG. 16, which produces a FIFO allocation scheme in response to requests for the next free, or any free integer is in contrast to the free list of FIG. 14, which produces a LIFO allocation scheme in response to requests for the next free, or any free integer.

Figure 17:
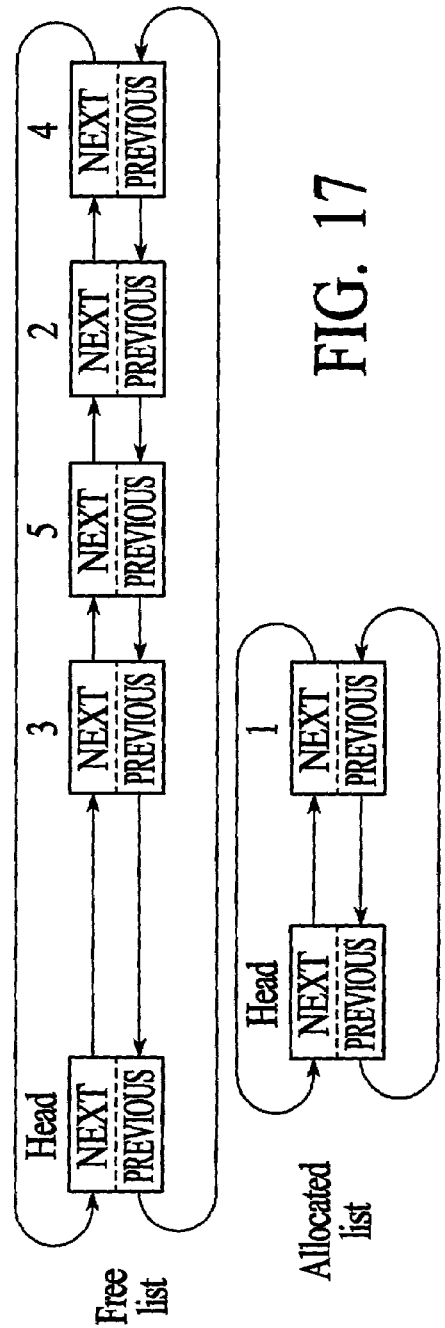
FIG. 17 depicts the free and allocated lists from FIG. 16 after another specific integer, integer four, is added to the free list in a FIFO manner.

FIG. 17 depicts a logical representation of the free and allocated lists from FIG. 16 after integer four is freed and added to the end of the free list instead of to the front of the free list as is the case in FIG. 15. The free list of FIG. 16, which produces a FIFO allocation scheme in response to requests for the next free, or any free integer is in contrast to the free list of FIG. 15, which produces a LIFO allocation scheme in response to requests for the next free, or any free integer.

As stated above, the invention involves managing a pool of integers by dividing the pool of integers into groups of integers and initializing, in memory, doubly linked lists related to the groups of integers on an as needed basis in response to requests for free integers. The description related to FIGS. 7–17, which is provided for background purposes, describes managing a pool of n integers with one doubly linked list of linked list elements that are all preinitialized in memory. The description related to FIGS. 18–28 describes managing a pool of integers by dividing the pool of integers into groups of integers and initializing, in memory, doubly linked lists related to the groups of integers on an as needed basis in response to requests for free integers.

Figure 18:
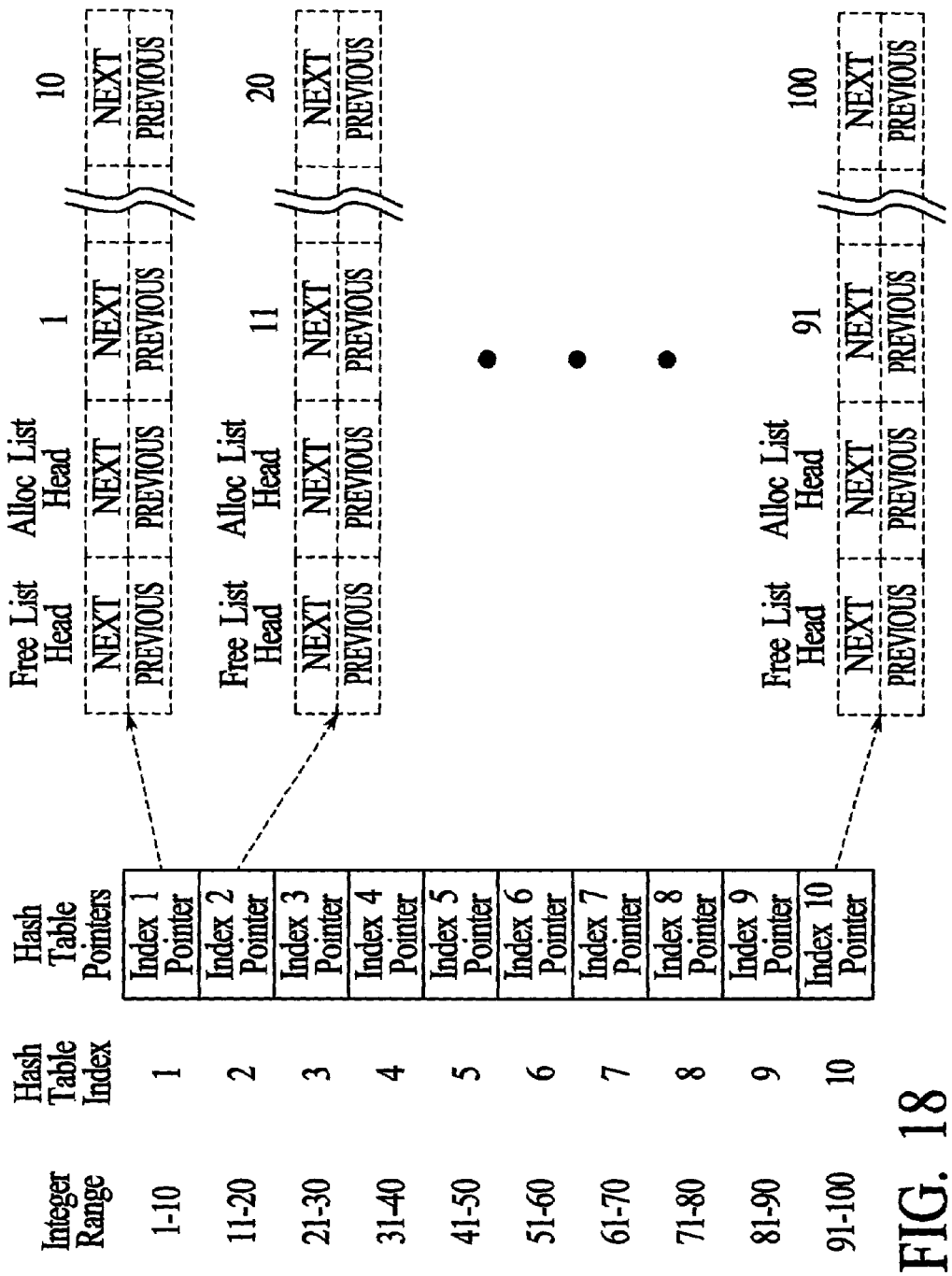
FIG. 18 depicts a logical overview of a pool of n integers that is divided into groups, with the groups of integers being managed with group-specific doubly linked lists that are initialized on an as needed basis and whose locations in memory are identified through a hash table.

FIG. 18 depicts a logical overview of a pool of n integers that is divided into groups, with the groups of integers being managed with group-specific doubly linked lists that are initialized on an as needed basis and whose locations in memory are identified through a hash table. In the example of FIG. 18, the pool of integers includes one hundred integers (i.e., n=100) and the integers are divided into groups of ten integers. In the embodiment of FIG. 18, each group of integers includes a continuous range of ten integers (i.e., 1–10, 11–20, . . . 91–100) and each range of integers is related to a hash table index (i.e., 1–10). The hash table indexes are in turn related to hash table pointers. The hash table pointers identify the locations in memory of the doubly linked lists that represent particular groups of integers. As shown in FIG. 18, the hash table pointer of index one identifies the doubly linked list that represents integers 1–10, the hash table pointer of index two identifies the doubly linked list that represents integers 11–20 and so on. The doubly linked lists are represented by dashed lines in FIG. 18 because the doubly linked lists are initialized in memory on an as needed basis and are deleted from memory when a doubly linked list no longer includes allocated integers. The doubly linked lists shown in FIG. 18 are each related to a different group of integers and the doubly linked lists function individually as described above with reference to FIGS. 7–17. In the embodiment of FIG. 18, each doubly linked list includes a free list head, an allocated list head, and ten linked list elements that represent ten integers. Although FIG. 18 represents an embodiment with one-hundred integers divided into groups of ten integers, the total number of integers and the number of integers per group can be different depending on the application.

Managing a pool of integers by dividing the pool of integers into groups and initializing doubly linked lists on an as needed basis is described below with reference to FIGS. 18–27. Before any integers from the pool of integers have been allocated, all of the doubly linked lists are inactive and all of the hash table pointers in the hash table indicate that their respective doubly linked lists are inactive (i.e., their pointer values are set to zero). For example purposes, assume that a request for the next free, or any free, integer is received from an application. Since no integers are allocated, none of the doubly linked lists have been initialized. In an embodiment, the first group of integers (also referred to herein as a row of integers) is activated by initializing a doubly linked list that corresponds to the group of integers. In the example of FIG. 18, a doubly linked list at hash table index one (i.e., representing integers 1–10) is initialized. In an embodiment, initializing the doubly linked list in memory involves allocating the memory space, setting the hash table pointer to identify the memory location of the doubly linked list, and setting all of the pointer values of the doubly linked list such that all of the integers are linked in sequential order to the free list head.

Figure 19:
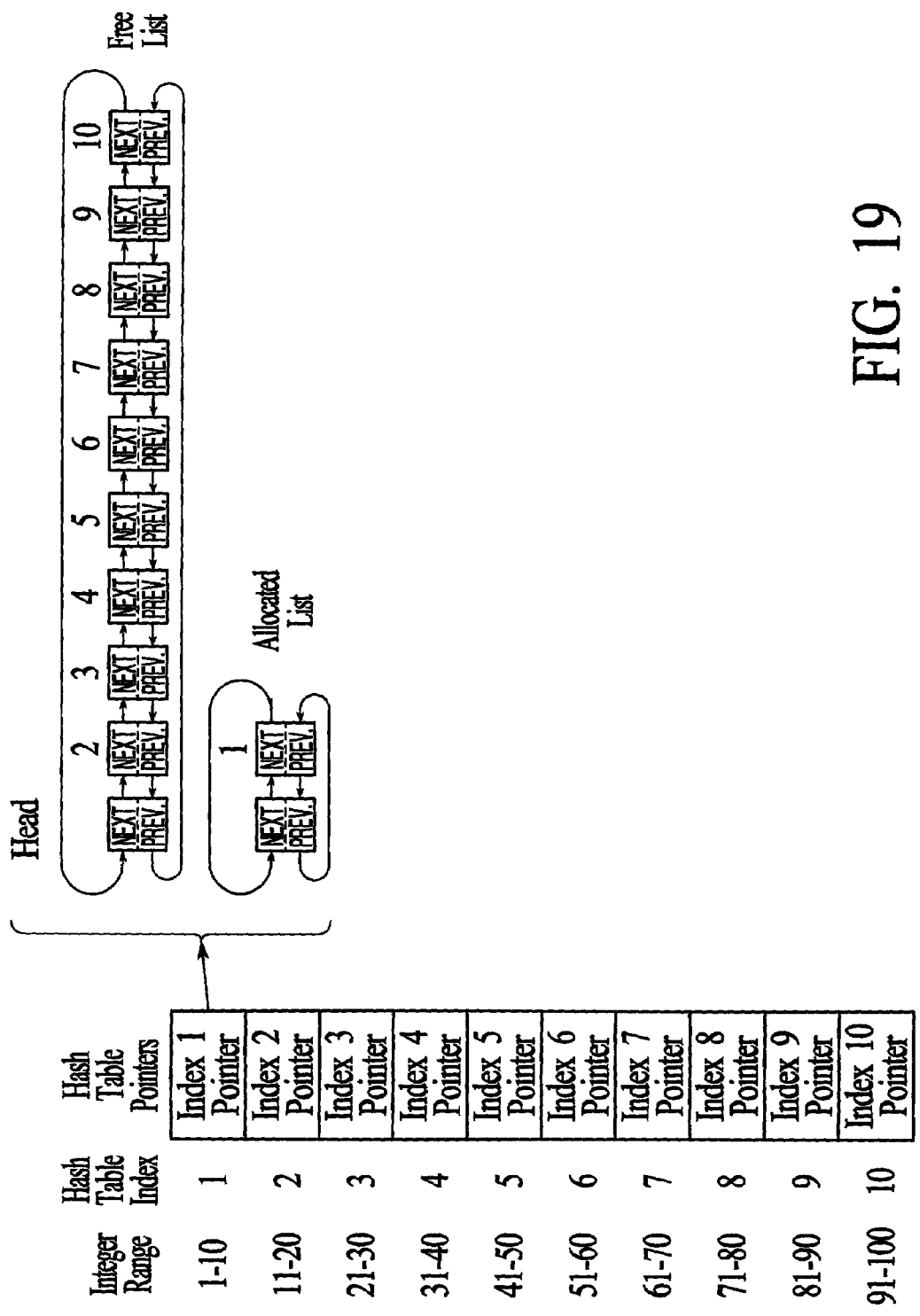
FIG. 19 is a logical representation of the hash table and the active doubly linked list of FIG. 18 after a request for the next free integer has been satisfied.

Once the doubly linked list is initialized, the request for the next free integer is satisfied by accessing the NEXT pointer of the free list head to identify the next free integer. The NEXT pointer of the free list head points to the linked list element of the next free integer. In the example, the next free integer is integer one because no other integers in the group have been allocated. The next free integer is allocated by removing the related linked list element from the free list. In an embodiment, the allocated integer is added to the allocated list upon being removed from the free list. The linked list element is removed from the free list in an O(1) operation and added to the allocated list in another O(1) operation. FIG. 19 is a logical representation of the hash table and the active doubly linked list related to integers 1–10 after the request for the next free integer has been satisfied. As shown in FIG. 19, integer one has been allocated and as a result, the free list includes integers two through ten and the allocated list includes integer one. Note that only one doubly linked list has been initialized in response to the request for the next free integer.

Figure 20:
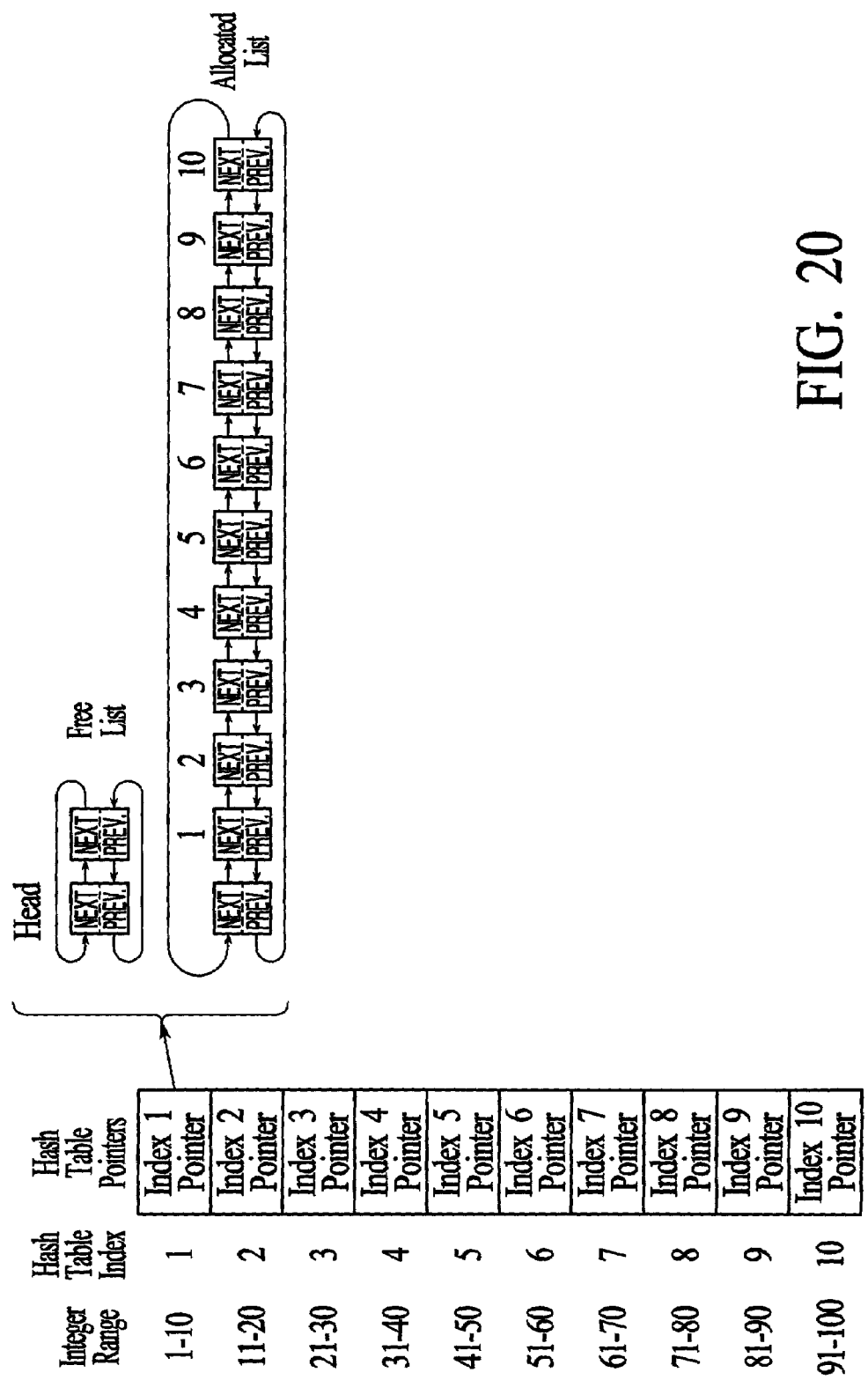
FIG. 20 is a logical representation of the hash table and the active doubly linked list of FIG. 19 after all of the linked list elements are added to the allocated list.
Figure 21:
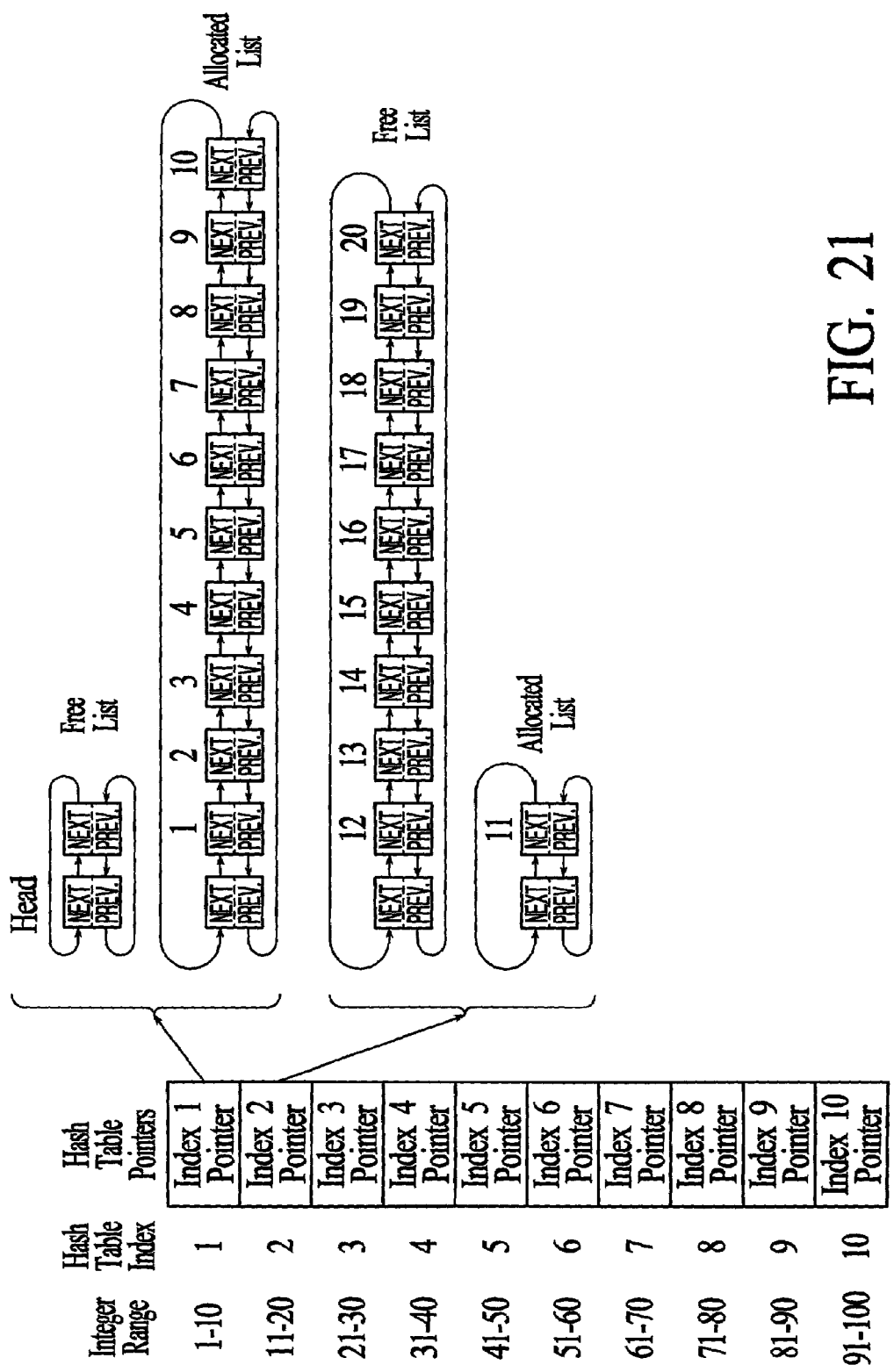
FIG. 21 is a logical representation of the hash table and the active doubly linked lists of FIG. 20 after a request for the next free integer has been satisfied.

For example purposes assume that the rest of the integers in the first group of integers get allocated in response to requests for the next free integer or requests for specific integers. FIG. 20 depicts the doubly linked list related to hash table index one with all of the linked list elements attached to the allocated list head and the free list head pointing to itself. Upon receiving another request for the next free integer, the free list head of group one is accessed and because the NEXT pointer identifies itself, there are no free integers in the first group. Upon determining that there are no free integers in the first group, the next hash table pointer (the index 2 pointer) in the hash table is accessed and because the row is inactive, the hash table pointer is null. In order to allocate a free integer from the second group of integers, the doubly linked list related to the second group of integers is initialized in memory and the index two hash table pointer is set to identify the location in memory of the doubly linked list. After the doubly linked list is initialized, the next free integer is identified from the NEXT pointer of the free list head. In the example of FIG. 20, the next free integer is integer eleven. The linked list element related to the next free integer is removed from the free list in an O(1) operation and added to the allocated list in another O(1) operation. FIG. 21 is a logical representation of the hash table and the active doubly linked lists related to integers 1–10 and 11–20 after the request for the next free integer has been satisfied. As shown in FIG. 21, the linked list element related to integer eleven has been removed from the free list and added to the allocated list. Additionally, all of the linked list elements for integers 1–10 are still attached to the allocated list head of the index one doubly linked list and the linked list elements for integers 12–20 are attached to the free list head of the index two doubly linked list. Note that only two doubly linked lists are active after the request for the next free integer is satisfied.

Figure 22:
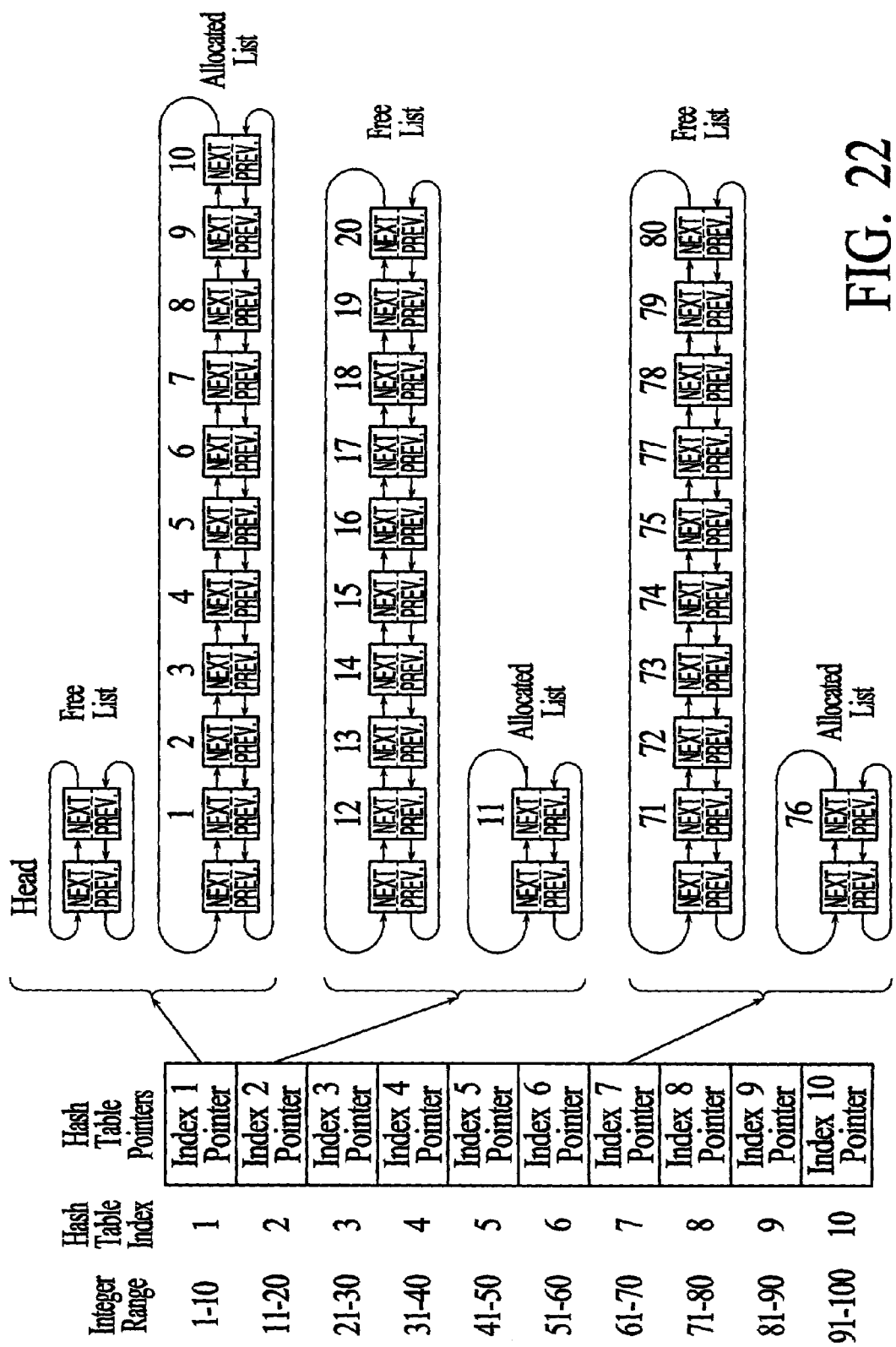
FIG. 22 is a logical representation of the hash table and the active doubly linked lists of FIG. 21 after a request for specific integer seventy-six has been satisfied.

Assume now that a request is made for a specific integer, for example integer seventy-six. Given the request for the specific integer, a hash table index is calculated and the hash table index is used to identify the related hash table pointer. In the example, a hash table index of seven is calculated and the hash table index is used to access the related hash table pointer in an O(1) operation. If the hash table pointer is null then the doubly linked list related to integers 71–80 is inactive and must be initialized. After initializing the doubly linked list related to integers 71–80, the specific integer is accessed and removed from the free list in two O(1) operations. If the doubly linked list is already active, then the linked list element related to the specific integer (integer seventy-six) is identified and removed from the free list in an O(1) operation. After the linked list element related to the specific integer is removed from the free list, the linked list element is added to the allocated list in another O(1) operation. FIG. 22 is a logical representation of the hash table and the active doubly linked lists related to integers 1–10, 11–20, and 71–80 after the request for specific integer seventy-six has been satisfied. Note that only three active doubly linked lists are required to satisfy all of the integer allocations.

Assume now that a request is made to free a specific integer, for example, integer eleven. Given the request to free the specific integer, a hash table index is calculated and the hash table index is used to identify the related hash table pointer. In the example, a hash table index of two is calculated and the hash table index is used to access the related hash table pointer in an O(1) operation. The hash table pointer is then used to locate, in memory, the doubly linked list that includes integer eleven. The linked list element related to integer eleven is accessed from the doubly linked list in an O(1) operation. The linked list element related to integer eleven is then removed from the allocated list in an O(1) operation and added to the free list in another O(1) operation.

Figure 23:
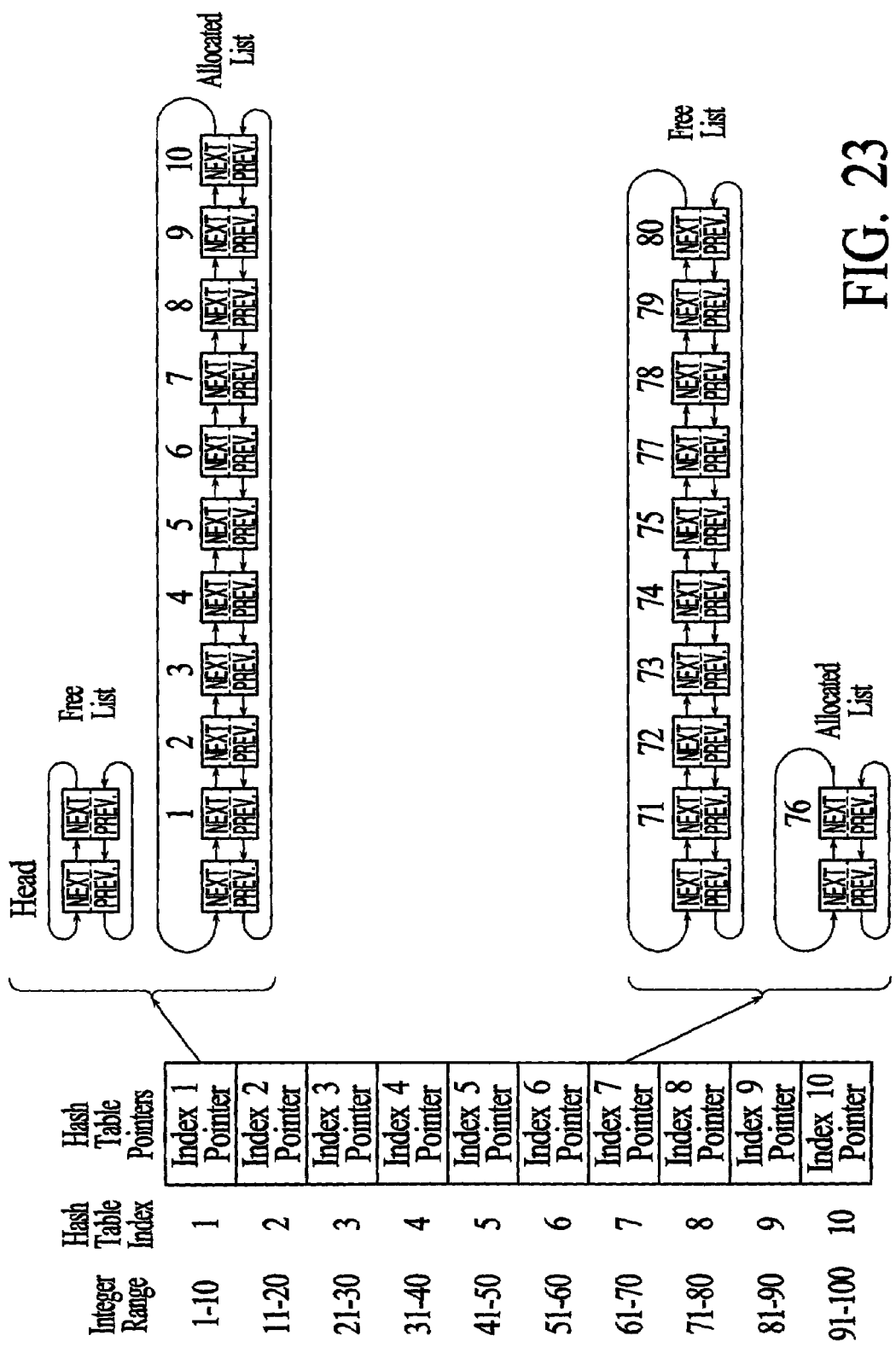
FIG. 23 is a logical representation of the hash table and the active doubly linked lists of FIG. 22 after a request to free integer eleven has been satisfied and the doubly linked list related to the group of integers 11–20 has been deleted from memory.

Once the specific integer is removed from the allocated list, a check is done to determine if all of the integers in the group of integers are on the free list. If all of the integers in the group are on the free list (i.e., the allocated list header points to itself), then the doubly linked list related to the group of integers is deleted from the memory. Deleting the doubly linked list from memory when no integers in the respective group are allocated conserves memory. FIG. 23 is a logical representation of the hash table and the active doubly linked lists related to integers 1–10 and 71–80 after the request to free integer eleven has been satisfied and the doubly linked list related to the group of integers 11–20 has been deleted from memory.

In an embodiment, the number N of integer groups in a management scheme is a function of the number n of integers in the pool and the number m of integers per group, such that N=n/m. In the example of FIG. 18, n=100 and m= 10 and therefore, N=100/10=10. In an embodiment, the hash table index ($I_H$) of a specific integer is calculated as:

$I_H$=specific integer/m.

In the example of FIG. 18, the hash table index is rounded up to the nearest integer. Example calculations of a hash table index, $I_H$, for specific integers 41 and 47 are:

Specific integer of 41: $I_H$=41/10=4.1→5

Specific integer of 47: $I_H$=47/10=4.7→5

Performance characteristics of the resource management scheme described herein are directly influenced by the size and number of integer groups that are established. Given the relationship between m and N, as described above, the number of groups N decreases as the number of integers per group m increases and vice versa the number of groups N increases as the number of integers per group m decreases.

Generally, the resource management scheme operates faster as the number of groups, N, decreases and the size of each group increases because searching through the hash table involves accessing a few number of rows. Although the scheme operates faster as N decreases, each initialized doubly linked list is larger and as a result the scheme is less memory efficient. Likewise, the scheme is more memory efficient as the size of each group m decreases because each initialized doubly linked list is smaller. Although the scheme is more memory efficient as m decreases, the decrease in the number of integers causes an increase in the number of groups, N, which in turn increases the time required to search the hash table. Choosing the right values of m and N is a tradeoff between memory utilization efficiency and performance.

Figure 24:
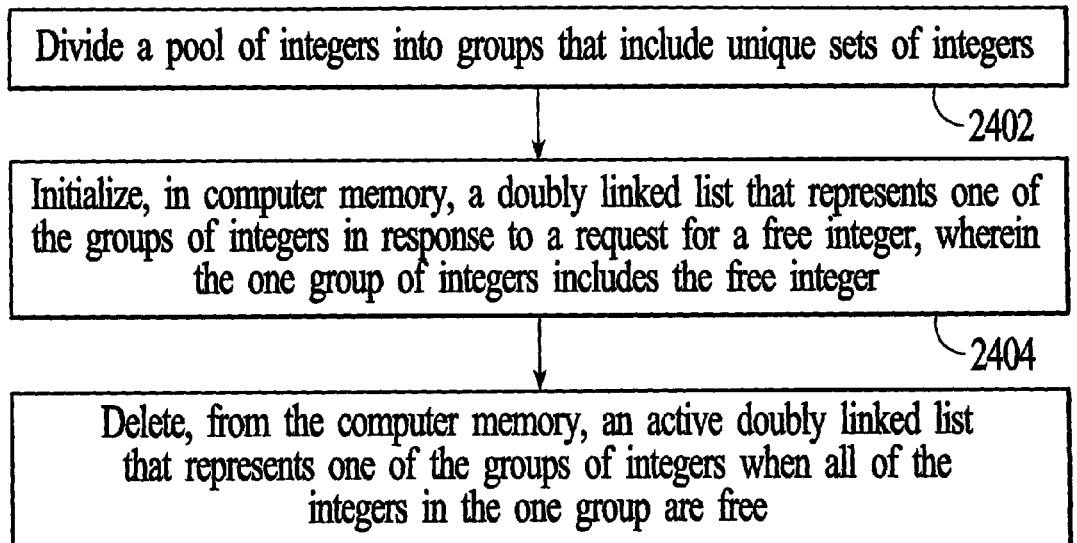
FIG. 24 depicts a process flow diagram of a method for managing a reusable resource.

FIG. 24 depicts a process flow diagram of a method for managing a reusable resource. At step 2402, a pool of integers is divided into groups that include unique sets of integers. At step 2404, a doubly linked list that represents one of the groups of integers is initialized, in computer memory, in response to a request for a free integer, where the initialized doubly linked list includes the free integer. In a further step 2406, an active doubly linked list that represents one of the groups of integers is deleted from memory when all of the integers in the group are free.

Figure 25:
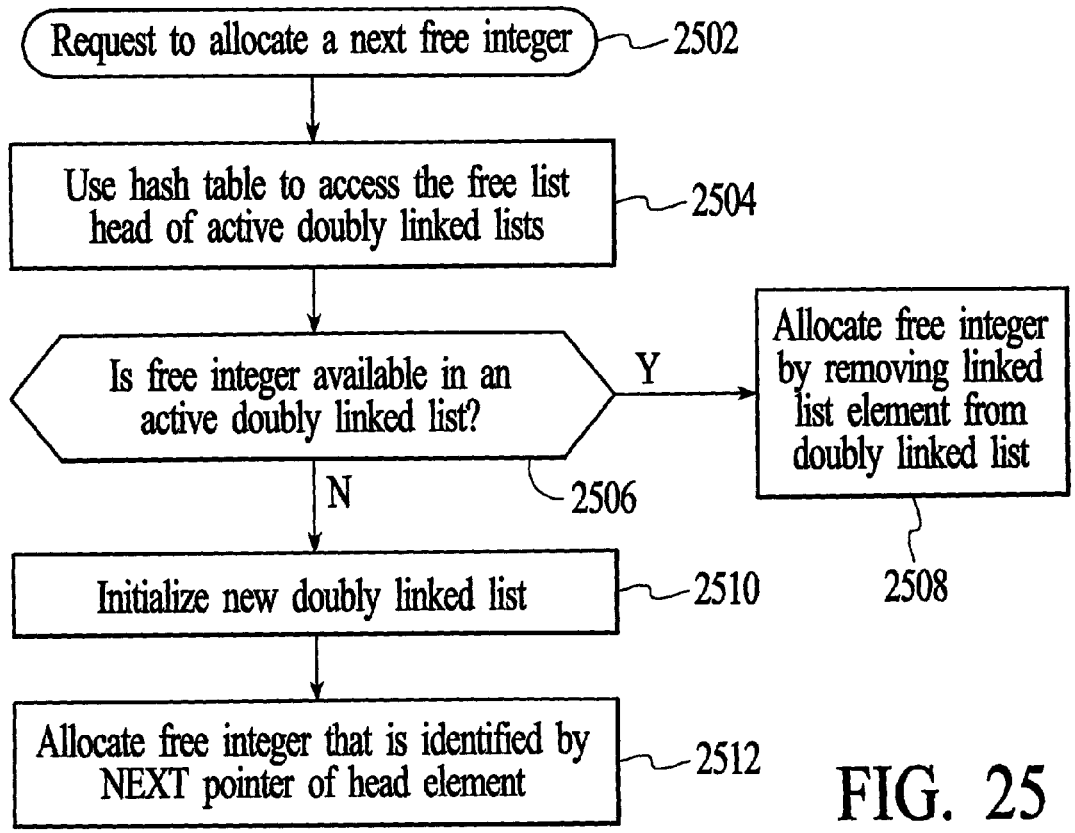
FIG. 25 depicts a process flow diagram that details a process for allocating a next free integer when groups of integers are initialized on an as needed basis and identified in memory through a hash table.

FIG. 25 depicts a process flow diagram that details a process for allocating a next free integer when groups of integers are initialized on an as needed basis and identified in memory through a hash table. Upon receiving a request to allocate a next free integer (step 2502), a hash table is used to access the free list heads of active doubly linked lists (step 2504). Accessing the free list heads from the hash table is an O(n) operation. Upon accessing a free list head, it is determined if a free integer is available in the active doubly linked list (decision point 2506). If the free list head identifies a free integer, then the free integer is allocated by removing the related linked list element from the free list (step 2508). If the free list head points to itself, then there are no free integers in the doubly linked list and subsequent active doubly linked lists are checked for a free integer until a free integer is found. If there are no free integers available in the active doubly linked lists, then a new doubly linked list is initialized (step 2510). Once a new doubly linked list is initialized, the integer that is identified by the NEXT pointer of the head element is allocated by removing the related linked list element from the free list (step 2512).

Figure 26:
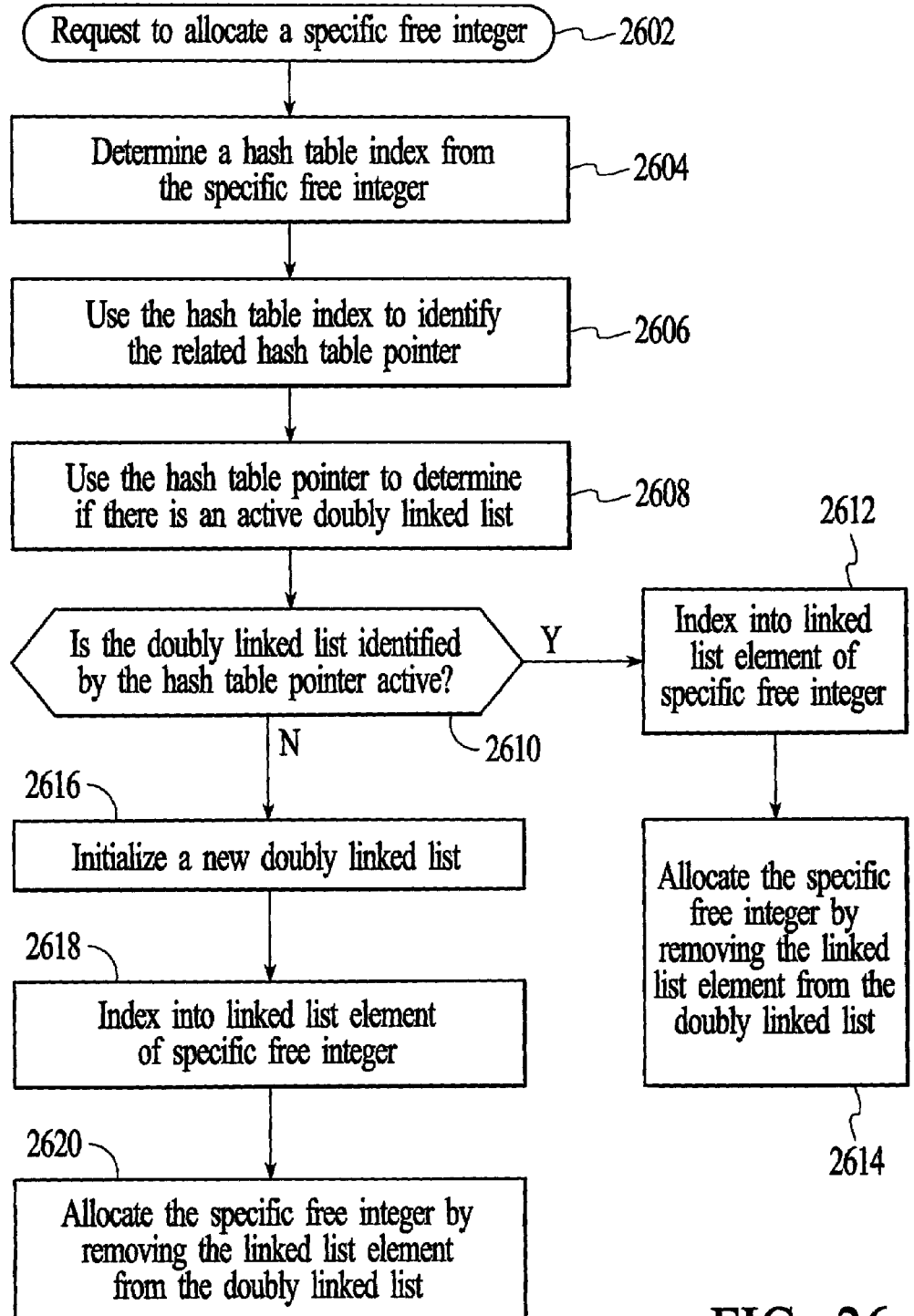
FIG. 26 depicts a process flow diagram that details a process for allocating a specific free integer where groups of integers are initialized on an as needed basis and identified in memory through a hash table.

FIG. 26 depicts a process flow diagram that details a process for allocating a specific free integer where groups of integers are initialized on an as needed basis and identified in memory through a hash table. Upon receiving a request to allocate a specific free integer (step 2602), the specific integer is used to determine a hash table index (step 2604). The hash table index is used to identify a related hash table pointer (step 2606). Using the hash table index to identify a related hash table pointer is an O(1) operation. The hash table pointer is then used to determine if the doubly linked list is active (step 2608). In an embodiment, a zero value for the hash table pointer indicates that the doubly linked list is inactive. At decision point 2610, if the doubly linked list is determined to be active, then at step 2612, the linked list element related to the specific integer is accessed (by indexing into the list). Accessing the specific integer in the doubly linked list is an O(1) operation. Once the specific integer is accessed, the specific integer is allocated at step 2614 by removing the related linked list element from the free list (another O(1) operation). If the doubly linked list is determined to be inactive, then at step 2616, a new doubly linked list, representing the group of integers that includes the specific integer, is initialized. Next, the linked list element related to the specific integer is accessed (by indexing into the list) in an O(1) operation (step 2618). Once the specific integer is accessed, the specific integer is allocated at step 2620 by removing the related linked list element from the free list (another O(1) operation).

Figure 27:
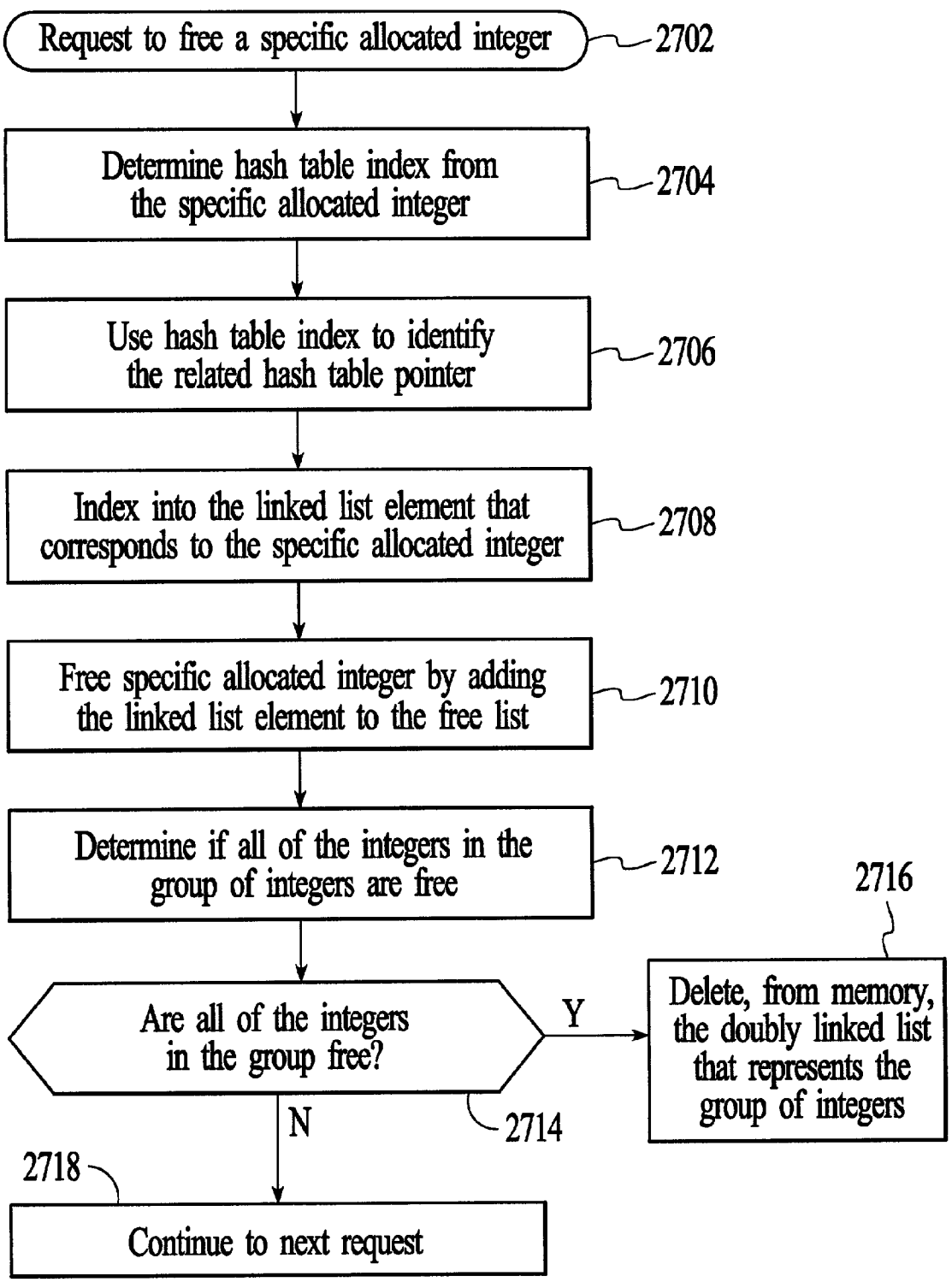
FIG. 27 depicts a process flow diagram that details a process for freeing an allocated integer when groups of integers are initialized on an as needed basis and identified in memory through a hash table.

FIG. 27 depicts a process flow diagram that details a process for freeing an allocated integer when groups of integers are initialized on an as needed basis and identified in memory through a hash table. Upon receiving a request to free a specific allocated integer (step 2702), the specific allocated integer is used to determine a hash table index (step 2704). The hash table index is then used to identify a related hash table pointer (step 2706). Using the hash table index to identify the related hash table pointer is an O(1) operation. The hash table pointer is then used to index into (access) the doubly linked list to the linked list element of the allocated integer (step 2708). Indexing into the doubly linked list is an O(1) operation. The allocated integer is then freed at step 2710 by adding the respective linked list element to the free list as described above with reference to FIGS. 14–17. After the specific integer is freed, at step 2712, it is determined if all of the integers in the respective group are free. At decision point 2714, if all of the integers in the group are free, then the doubly linked list is deleted from memory (step 2716). If all of the integers in the group are not free, then the doubly linked list is left as it is and a next request can be processed (step 2718).

As an alternative to checking the free list head to determine if there are any free integers, the doubly linked lists may include a field that keeps a count of the number of free integers in a doubly linked list. The field can be checked to determine whether or not the doubly linked list should be deleted from memory.

Figure 28:
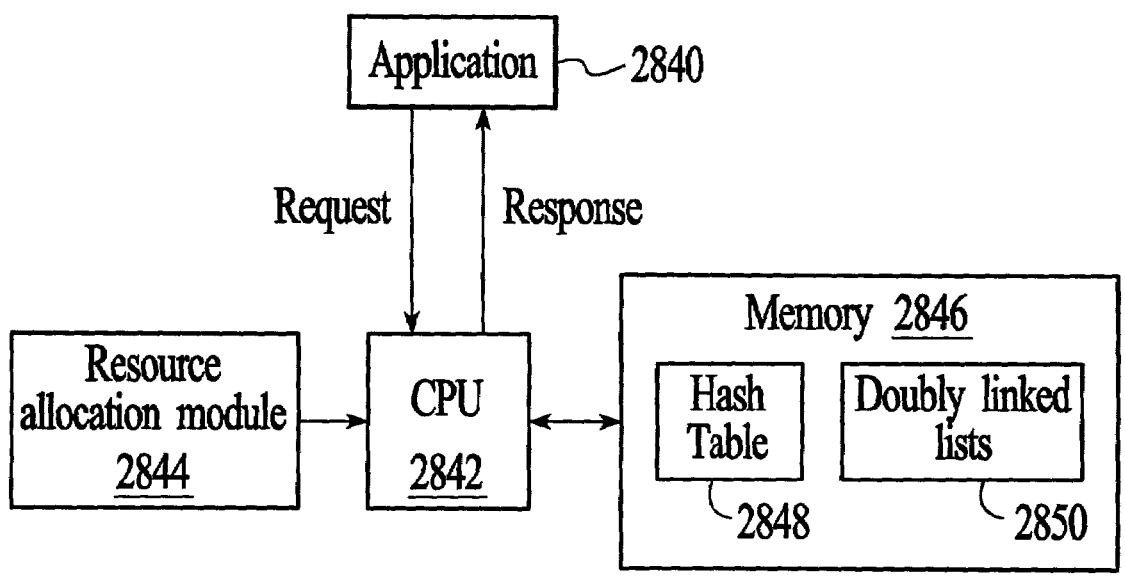
FIG. 28 depicts a system for managing a re-usable resource such as a pool of integers in accordance with an embodiment of the invention.

FIG. 28 depicts an embodiment of a system for managing a re-usable resource such as a pool of integers. The system includes an application 2840, a central processing unit (CPU) 2842, a resource allocation module 2844, and a memory 2846. The memory stores a hash table 2848 and doubly linked lists 2850. The doubly linked lists are stored on an as needed basis as described above. The application includes any application that requires unique integers from a pool of integers. In an embodiment, the application generates a request for a free integer and receives a free integer in response. The CPU is a multifunction processor that implements software instructions that are stored in memory. In an embodiment, the resource allocation module is a set of software instructions (computer code) that implements the technique for managing a reusable resource that is described above with reference to FIGS. 7–27. The memory is computer memory, such as DRAM, that is accessible to the CPU. The memory stores the hash table and active doubly linked lists that are initialized and managed via the resource allocation module.

Although specific embodiments of the invention have been described and illustrated, the invention is not to be limited to the specific forms or arrangements of parts as described and illustrated herein. The invention is limited only by the claims.

What is claimed is:

1. A computer-implemented method for managing a re-usable resource comprising:
   dividing a pool of integers into groups that include unique sets of integers; and
   initializing, in computer memory, a doubly linked list that represents one of said groups of integers in response to a request for a free integer, wherein said one group of integers includes said free integer.

2. The computer-implemented method of claim 1 further including deleting, from said computer memory, an active doubly linked list that represents one of said groups of integers when all of the integers in said one group are free.

3. The computer-implemented method of claim 1 wherein initializing a doubly linked list includes:
   establishing an array of linked list elements that defines said group of integers, wherein each linked list element includes a next pointer for identifying a next linked list element and a previous pointer for identifying a previous linked list element;
   forming a doubly linked list, from said linked list elements, that includes all of the integers in said group of integers; and
   establishing a head element having a next pointer for identifying one end of said doubly linked list and a previous pointer for identifying the other end of said doubly linked list.

4. The computer-implemented method of claim 1 wherein dividing said pool of integers into groups includes establishing a hash table that includes hash table pointers, wherein said hash table pointers identify locations in said computer memory of doubly linked lists that are related to said groups of integers.

5. The computer-implemented method of claim 4 wherein said hash table pointers are related to hash table index values.

6. The computer-implemented method of claim 4 further including allocating a next free integer by:
   using said hash table pointers to search through active doubly linked lists for a next free integer;
   if a next free integer exists on an active doubly linked list, then removing the linked list element related to said next free integer from the respective doubly linked list; and
   if a next free integer does not exist in any of the active doubly linked lists, then initializing, in said computer memory, a new doubly linked list and removing a linked list element from said new doubly linked list.

7. The computer-implemented method of claim 6 wherein removing a linked list element includes accessing a free list head element to identify the next free integer in a doubly linked list.

8. The computer-implemented method of claim 4 further including allocating a specific free integer by:
   determining a hash table index related to said specific free integer;
   using said hash table index to identify a related hash table pointer;
   using said hash table pointer to determine if the related doubly linked list is active;
   if said doubly linked list is active, then indexing into the linked list element that is related to said specific integer and removing said linked list element from said doubly linked list;
   if said doubly linked list is not active, then initializing a doubly linked list that is related to the group of integers that includes said specific integer, indexing into said doubly linked list to the linked list element that is related to said specific integer, and removing said linked list element, that corresponds to said specific integer, from said doubly linked list.

9. The computer-implemented method of claim 8 wherein removing a linked list element includes:

using the next pointer, of said linked list element that corresponds to said specific integer, to identify the next linked list element in said doubly linked list;

adjusting the previous pointer of said identified next linked list element to exclude, from said doubly linked list, said linked list element that corresponds to said specific integer;

using the previous pointer, of said linked list element that corresponds to said specific integer, to identity the previous linked list element in said doubly linked list; and adjusting the next pointer of said identified previous linked list element to exclude, from said doubly linked list, said linked list element that corresponds to said specific integer.

10. The computer-implemented method of claim 4 further including freeing a specific integer by:

determining a hash table index related to said specific integer;

using said hash table index to locate the linked list element that is related to said specific integer; and attaching said linked list element to the doubly linked list of free integers that is related to the group of integers that includes said specific integer.

11. The computer-implemented method of claim 10 further including:

determining if all integers in said group of integers that includes said specific integer are free; and if all of the integers in said group of integers that includes said specific integer are free, then deleting the related doubly linked list from said computer memory.

12. A computer-implemented method for managing a re-usable resource comprising:

dividing a pool of integers into groups that include unique sets of integers; and initializing, in computer memory, one of said groups of integers as a doubly linked list of free integers in response to a request for a next free integer or a specific free integer if said next free integer or said specific free integer is determined to be in a group of integers that has not been initialized.

13. The computer-implemented method of claim 12 further including deleting, from said computer memory, an active doubly linked list that represents one of said groups of integers when all of the integers in said one group are free.

14. The computer-implemented method of claim 12 wherein initializing a doubly linked list includes:

establishing an array of linked list elements that defines said group of integers, wherein each linked list element includes a next pointer for identifying a next linked list element and a previous pointer for identifying a previous linked list element;

forming a doubly linked list, from said linked list elements, that includes all of the integers in said group of integers; and establishing a head element having a next pointer for identifying one end of said doubly linked list and a previous pointer for identifying the other end of said doubly linked list.

15. The computer-implemented method of claim 12 wherein dividing said pool of integers into groups includes establishing a hash table that includes hash table pointers, wherein said hash table pointers identify locations in said computer memory of doubly linked lists that are related to said groups of integers.

16. The computer-implemented method of claim 15 wherein said hash table pointers are related to hash table index values.

17. The computer-implemented method of claim 15 further including allocating a next free integer by:

using said hash table pointers to search through active doubly linked lists for a next free integer;

if a next free integer exists on an active doubly linked list, then removing the linked list element related to said next free integer from the respective doubly linked list; and if a next free integer does not exist in any of the active doubly linked lists, then initializing, in said computer memory, a new doubly linked list and removing a linked list element from said new doubly linked list.

18. The computer-implemented method of claim 17 wherein removing a linked list element includes accessing a free list head element to identify the next free integer in a doubly linked list.

19. The computer-implemented method of claim 15 further including allocating a specific free integer by:

determining a hash table index related to said specific free integer;

using said hash table index to identify a related hash table pointer;

using said hash table pointer to determine if the related doubly linked list is active;

if said doubly linked list is active, then indexing into the linked list element that is related to said specific integer and removing said linked list element from said doubly linked list;

if said doubly linked list is not active, then initializing a doubly linked list that is related to the group of integers that includes said specific integer, indexing into said doubly linked list to the linked list element that is related to said specific integer, and removing said linked list element, that corresponds to said specific integer, from said doubly linked list.

20. The computer-implemented method of claim 19 wherein removing a linked list element includes:

using the next pointer, of said linked list element that corresponds to said specific integer, to identify the next linked list element in said doubly linked list;

adjusting the previous pointer of said identified next linked list element to exclude, from said doubly linked list, said linked list element that corresponds to said specific integer;

using the previous pointer, of said linked list element that corresponds to said specific integer, to identify the previous linked list element in said doubly linked list; and adjusting the next pointer of said identified previous linked list element to exclude, from said doubly linked list, said linked list element that corresponds to said specific integer.

21. The computer-implemented method of claim 15 further including freeing a specific integer by:

determining a hash table index related to said specific integer;

using said hash table index to locate the linked list element that is related to said specific integer; and attaching said linked list element to the doubly linked list of free integers that is related to the group of integers that includes said specific integer.

22. The computer-implemented method of claim 21 further including:

determining if all integers in said group of integers that includes said specific integer are free; and if all of the integers in said group of integers that includes said specific integer are free, then deleting the related doubly linked list from said computer memory.

23. A computer-implemented system for managing a re-usable resource comprising:

computer memory;

a hash table, stored in said computer memory, that includes a plurality of hash table pointers that are related to unique groups of integers from an integer pool, each of said hash table pointers including a field for identifying a location in said computer memory of a doubly linked list that is related to one of said groups of integers; and means for initializing, in said computer memory, a doubly linked list that represents one of said groups of integers in response to a request for a free integer, wherein said one group of integers includes said free integer.

24. The computer-implemented system of claim 23 further including means for deleting, from said computer memory, an active doubly linked list that represents one of said groups of integers when all of the integers in said one group are free.

25. The computer-implemented system of claim 23 wherein each initialized doubly linked list includes:

an array of linked list elements that defines the respective group of integers, wherein each linked list element includes a next pointer for identifying a next linked list element and a previous pointer for identifying a previous linked list element, said linked list elements being formed into a doubly linked list; and a head element having a next pointer for identifying one end of said doubly linked list and a previous pointer for identifying the other end of said doubly linked list.

26. The computer-implemented system of claim 23 wherein said hash table pointers are associated with unique hash table index values.

27. The computer-implemented system of claim 23 further including means for allocating a next free integer by:

using said hash table pointers to search through active doubly linked lists for a next free integer;

if a next free integer exists on an active doubly linked list, then removing the linked list element related to said next free integer from the respective doubly linked list; and if a next free integer does not exist in any of the active doubly linked lists, then initializing, in said computer memory, a new doubly linked list and removing a linked list element from said new doubly linked list.

28. The computer-implemented system of claim 27 wherein removing a linked list element includes accessing a free list head element to identify the next free integer in a doubly linked list.

29. The computer-implemented system of claim 23 further including means for allocating a specific free integer by:

determining a hash table index related to said specific free integer;

using said hash table index to identify a related hash table pointer;

using said hash table pointer to determine if the related doubly linked list is active;

if said doubly linked list is active, then indexing into the linked list element that is related to said specific integer and removing said linked list element from said doubly linked list;

if said doubly linked list is not active, then initializing a doubly linked list that is related to the group of integers that includes said specific integer, indexing into said doubly linked list to the linked list element that is related to said specific integer, and removing said linked list element, that corresponds to said specific integer, from said doubly linked list.

30. The computer-implemented system of claim 29 wherein removing a linked list element includes:

using the next pointer, of said linked list element that corresponds to said specific integer, to identify the next linked list element in said doubly linked list;

adjusting the previous pointer of said identified next linked list element to exclude, from said doubly linked list, said linked list element that corresponds to said specific integer;

using the previous pointer, of said linked list element that corresponds to said specific integer, to identify the previous linked list element in said doubly linked list; and adjusting the next pointer of said identified previous linked list element to exclude, from said doubly linked list, said linked list element that corresponds to said specific integer.

31. The computer-implemented system of claim 23 further including means for freeing a specific integer by:

determining a hash table index related to said specific integer;

using said hash table index to locate the linked list element that is related to said specific integer; and attaching said linked list element to the doubly linked list of free integers that is related to the group of integers that includes said specific integer.

32. The computer-implemented system of claim 31 further including means for:

determining if all integers in said group of integers that includes said specific integer are free; and if all of the integers in said group of integers that includes said specific integer are free, then deleting the related doubly linked list from said computer memory.

33. A computer-readable medium for managing a re-usable resource, said computer-readable medium comprising:

computer code for:

dividing a pool of integers into groups that include unique sets of integers; and initializing, in computer memory, a doubly linked list that represents one of said groups of integers in response to a request for a free integer, wherein said one group of integers includes said free integer.

34. The computer-readable medium of claim 33 further including computer code for deleting, from said computer memory, an active doubly linked list that represents one of said groups of integers when all of the integers in said one group are free.

35. The computer-readable medium of claim 33 wherein initializing a doubly linked list includes:

establishing an array of linked list elements that defines said group of integers, wherein each linked list element includes a next pointer for identifying a next linked list element and a previous pointer for identifying a previous linked list element;

forming a doubly linked list, from said linked list elements, that includes all of the integers in said group of integers; and establishing a head element having a next pointer for identifying one end of said doubly linked list and a previous pointer for identifying the other end of said doubly linked list.

36. The computer-readable medium of claim 33 wherein dividing said pool of integers into groups includes establishing a hash table that includes hash table pointers, wherein said hash table pointers identify locations in said computer memory of doubly linked lists that are related to said groups of integers.

37. The computer-readable medium of claim 36 wherein said hash table pointers are related to hash table index values.

38. The computer program-readable medium of claim 36 further including computer code for allocating a next free integer by:
   using said hash table pointers to search through active doubly linked lists for a next free integer;
   if a next free integer exists on an active doubly linked list, then removing the linked list element related to said next free integer from the respective doubly linked list; and
   if a next free integer does not exist in any of the active doubly linked lists, then initializing, in said computer memory, a new doubly linked list and removing a linked list element from said new doubly linked list.

39. The computer-readable medium of claim 38 wherein removing a linked list element includes accessing a free list head element to identify the next free integer in a doubly linked list.

40. The computer-readable medium of claim 36 further including computer code for allocating a specific free integer by:
   determining a hash table index related to said specific free integer;
   using said hash table index to identify a related hash table pointer;
   using said hash table pointer to determine if the related doubly linked list is active;
   if said doubly linked list is active, then indexing into the linked list element that is related to said specific integer and removing said linked list element from said doubly linked list;
   if said doubly linked list is not active, then initializing a doubly linked list that is related to the group of integers that includes said specific integer, indexing into said doubly linked list to the linked list element that is related to said specific integer, and removing said linked list element, that corresponds to said specific integer, from said doubly linked list.

41. The computer-readable medium of claim 40 wherein removing a linked list element includes:
   using the next pointer, of said linked list element that corresponds to said specific integer, to identify the next linked list element in said doubly linked list;
   adjusting the previous pointer of said identified next linked list element to exclude, from said doubly linked list, said linked list element that corresponds to said specific integer;
   using the previous pointer, of said linked list element that corresponds to said specific integer, to identify the previous linked list element in said doubly linked list; and
   adjusting the next pointer of said identified previous linked list element to exclude, from said doubly linked list, said linked list element that corresponds to said specific integer.

42. The computer-readable medium of claim 36 further including computer code for freeing a specific integer by:
   determining a hash table index related to said specific integer;
   using said hash table index to locate the linked list element that is related to said specific integer; and
   attaching said linked list element to the doubly linked list of free integers that is related to the group of integers that includes said specific integer.

43. The computer-readable medium of claim 42 further including computer code for:
   determining if all integers in said group of integers that includes said specific integer are free; and
   if all of the integers in said group of integers that includes said specific integer are free, then deleting the related doubly linked list from said computer memory.

* * * * *